US011461956B2

(12) United States Patent
Le Floch

(10) Patent No.: US 11,461,956 B2
(45) Date of Patent: Oct. 4, 2022

(54) 3D REPRESENTATION RECONSTRUCTION FROM IMAGES USING VOLUMIC PROBABILITY DATA

(71) Applicant: CANON KABUSHIKI KAISHA, Tokyo (JP)

(72) Inventor: Hervé Le Floch, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/000,903

(22) Filed: Aug. 24, 2020

(65) Prior Publication Data

US 2021/0065430 A1 Mar. 4, 2021

(30) Foreign Application Priority Data

Aug. 28, 2019 (GB) ...................................... 1912310

(51) Int. Cl.
*G06T 15/08* (2011.01)
*G06T 15/60* (2006.01)

(52) U.S. Cl.
CPC .............. *G06T 15/08* (2013.01); *G06T 15/60* (2013.01)

(58) Field of Classification Search
None
See application file for complete search history.

(56) References Cited

U.S. PATENT DOCUMENTS

| 9,478,022 B2 * | 10/2016 | Kamen | A61B 8/465 |
| 10,304,193 B1 * | 5/2019 | Wang | G06K 9/6262 |
| 2010/0111370 A1 | 5/2010 | Black et al. | |
| 2010/0158354 A1 * | 6/2010 | Kim | G06T 13/40 |
| | | | 382/154 |
| 2011/0210915 A1 * | 9/2011 | Shotton | G06K 9/00369 |
| | | | 345/157 |
| 2013/0250050 A1 * | 9/2013 | Kanaujia | H04N 7/181 |
| | | | 348/42 |
| 2016/0109938 A1 * | 4/2016 | Hoof | A63F 13/213 |
| | | | 463/33 |
| 2018/0227586 A1 * | 8/2018 | Choi | H04N 21/4307 |
| 2019/0266780 A1 * | 8/2019 | Le Floch | G06T 7/593 |
| 2021/0287799 A1 * | 9/2021 | Guendel | G16H 50/20 |

FOREIGN PATENT DOCUMENTS

EP 2239708 A2 10/2010

OTHER PUBLICATIONS

Kong-Man Cheung, Shape-From-Silhouette Across Time Part II: Applications to Human Modeling and Markerless Motion Tracking, Jul. 2005, pp. 225-245, International Journal of Computer Vision 63(3), Springer Science + Business Media, Inc., The Netherlands.

* cited by examiner

*Primary Examiner* — Nurun Flora
(74) *Attorney, Agent, or Firm* — Canon U.S.A., Inc. IP Division

(57) ABSTRACT

To generate 3D representation of a scene volume, the present invention combines the 3D skeleton approach and the shape from silhouette approach. The present invention efficiently works on complex scenes like sport events with multiple players in a stadium, with an ability to detect a wide number of interoperating 3D objects like multiple players.

20 Claims, 12 Drawing Sheets

Fig. 10
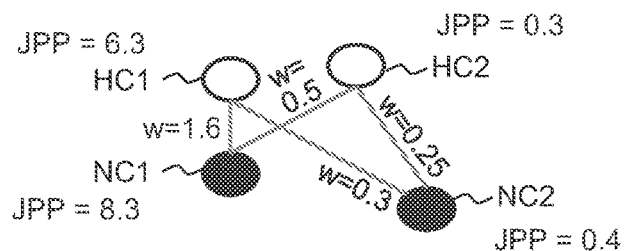
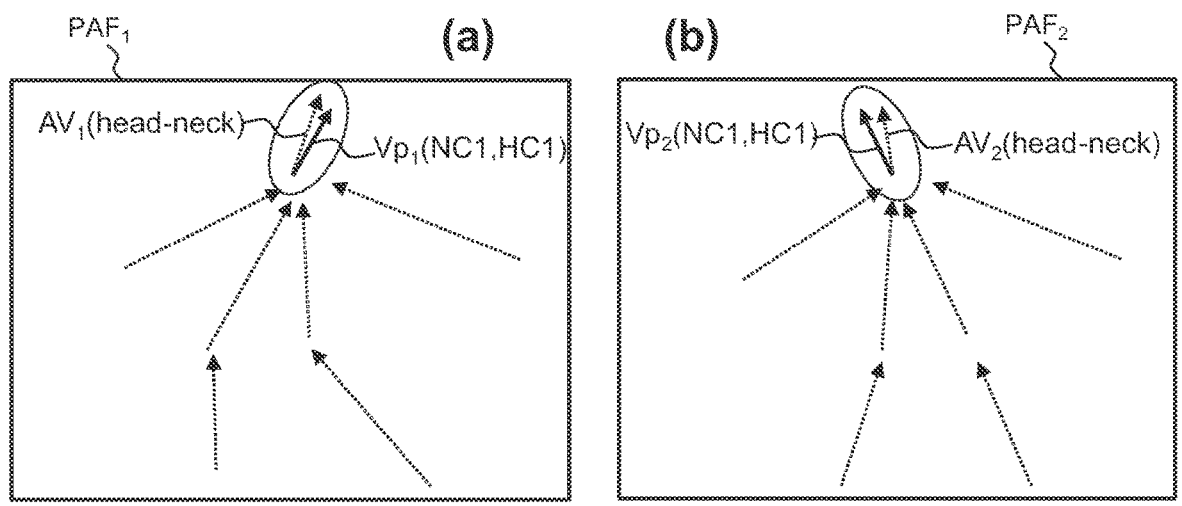
(a) Elementary link weight from PAF₁ = 0.9
(b) Elementary link weight from PAF₂ = 0.7
Weight for NC1-HC1 = 1.6
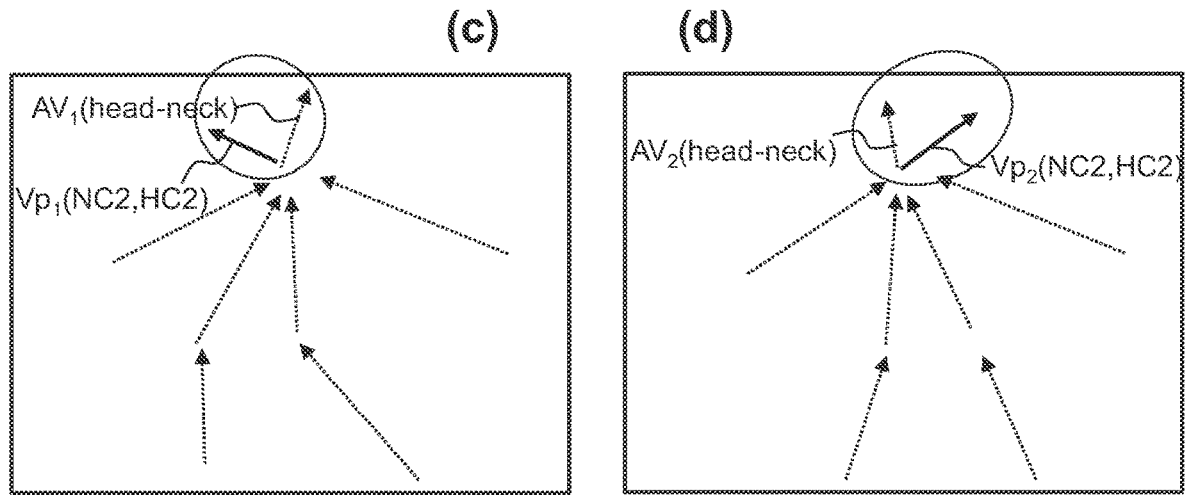
(c) Elementary link weight from PAF₁ = 0.1
(d) Elementary link weight from PAF₂ = 0.15
Weight for NC2-HC2 = 0.25

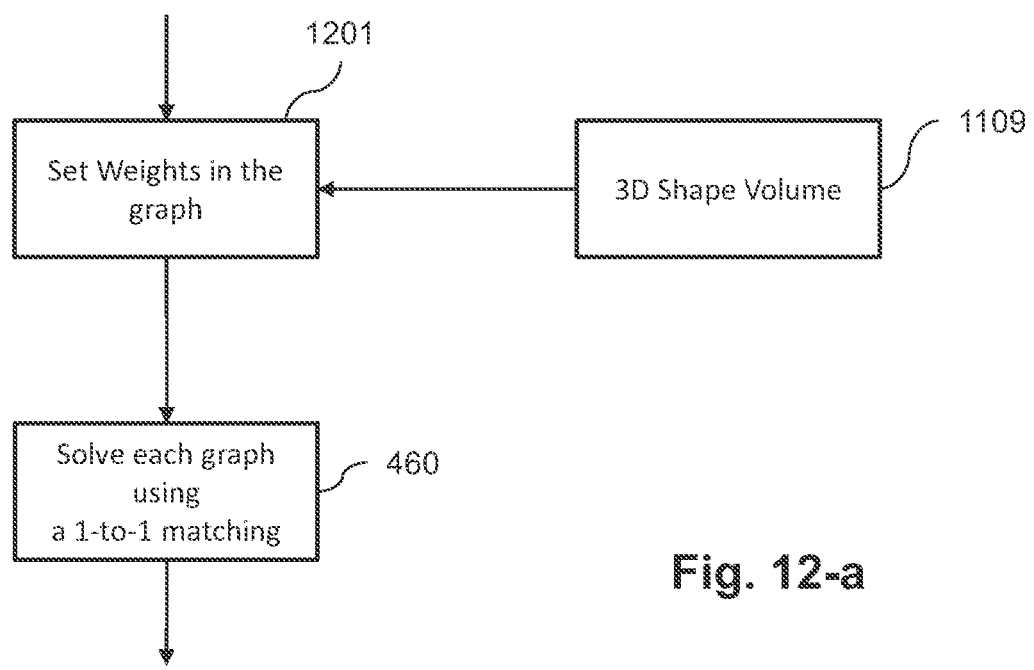
Fig. 12-a

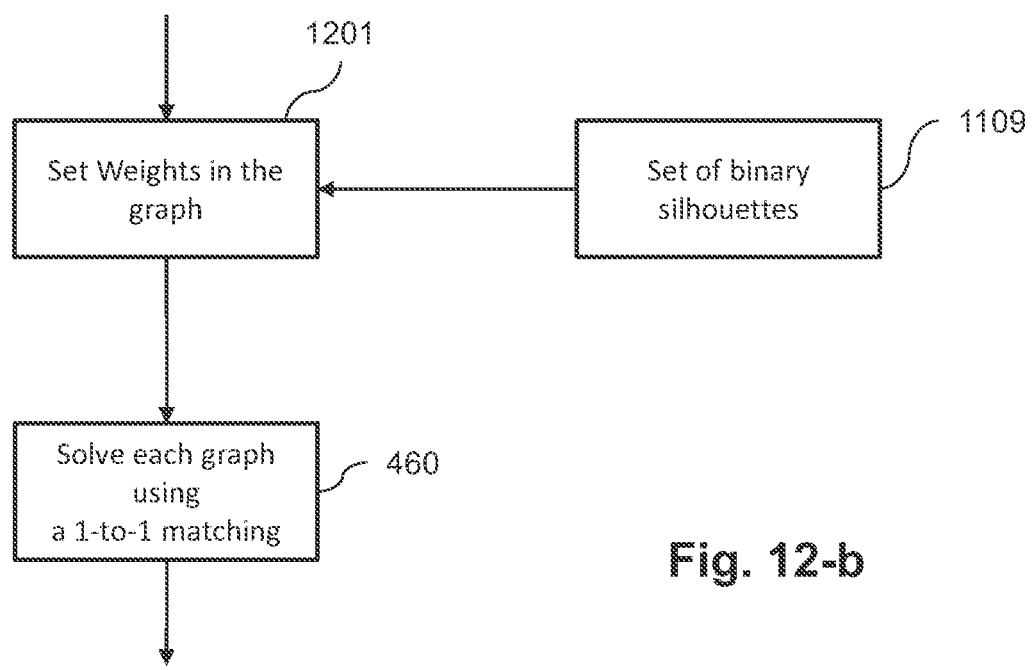
Fig. 12-b

3D REPRESENTATION RECONSTRUCTION FROM IMAGES USING VOLUMIC PROBABILITY DATA

FIELD OF THE INVENTION

The present invention relates generally to reconstruction of 3D representations, for example 3D skeletons or 3D shapes, from views of a 3D real world object.

BACKGROUND OF THE INVENTION

Reconstruction of 3D representations, is widely used in image-based rendering or 3D scene analysis. Various applications for 3D representation estimation and virtual rendering can be contemplated, including providing alternative views of the same animated 3D object from virtual cameras, for instance a new and more immersive view of a sport event. Various applications for 3D scene analysis can be contemplated, including analysis of the 3D motions of 3D skeletons.

Various attempts to provide methods and devices for 3D representation reconstruction have been made, including, for skeletons reconstruction, U.S. Pat. No. 8,830,236 and 3D Human Pose Estimation via Deep Learning from 2D annotations (2016 fourth International Conference on 3D Vision (3DV), Ernesto Brau, Hao Jiang). However, the efficiency of the techniques described in these documents remains insufficient in terms of performances, including memory use, processing time (for instance nearly real time such as less than a few seconds before rendering), ability to detect a maximum number of 3D real world objects in the scene.

A known method for shape reconstruction is known as convex or visual hull method or shape from silhouette. *Volumetric Modeling Using Shape from Silhouette*, In: M. O. Altan and L. Grundig (Eds.), Proc. of the 4th Int. Symposium—Turkish-German Joint Geodetic Days (TGJGD 01), volume I, Berlin, 2.-6. April 2001, pp. 469-476 describes such method. This method is based on capturing source images from different cameras. On each captured source images, a binary background information is determined for each pixel indicating if the associated pixel is part of the background or part of the object to be reconstructed. This binary background information may be seen as a silhouette image of the object to be reconstructed as seen by the camera. Then each three-dimensional part of the scene, each voxel, is projected on each image source according to the model of the camera. The voxel is provided with a background vote or a foreground vote according to the binary background information of the pixel the voxel is projected to. Voxels provided with at least one background vote are determined as being out of the object to be reconstructed. It means that voxels with no background vote are defined as being part of the 3D shape of one object of the scene. The 3D shape is therefore defined as the 3D volume corresponding to all these voxels or to the 3D surface making the frontier between voxels without background votes and other voxels. The method may be seen as an extrusion process, where each camera extrudes, based on its associated silhouette, the three-dimensional volume to end up with a volume giving the reconstructed shape. Objects to be reconstructed are considered globally with this shape from silhouette method. Close objects that appear with partial recovering on the camera source images cannot be discriminated.

Skeleton based methods are based on identifying part of the object to be reconstructed on the source image. From this identification and based on known geometrical relationship between these parts given from the skeleton, the location of the different parts constituting the object to be reconstructed are determined in the three-dimensional scene. These skeleton based methods are sometimes more precise than the shape from silhouette methods in the location of the different parts of the object to be reconstructed in the three-dimensional scene. In addition, they provide a way to have a semantic analysis of the scene. However, they are less efficient on the calculation of the volume/surface of the shape of the object.

SUMMARY OF INVENTION

New methods and devices to reconstruct 3D representations from source images of the same scene are proposed combining the shape from silhouette and the skeleton based approaches.

According to an aspect of the invention, it is provided a method for generating a 3D representation of a 3D object located in a scene volume, the method comprising by a computer system:
  obtaining from a memory of the computer system a plurality of source images of the scene volume recorded by one or more source cameras;
  executing on the obtained source images a step, of a skeleton-based method, for generating a 3D part probability volume, the 3D part probability volume comprising, for each part of the 3D object, a probability for a voxel of the scene volume to belong to that part;
  executing on the obtained source images a step, of a shape-from-silhouette method, for generating silhouette images of the 3D object compared to reference background images; and
  generating a 3D representation of the 3D object considering the generated 3D part probability volume and the silhouette images.

In an embodiment, the method further comprises generating a 3D shape volume based on the silhouette images generated using a shape-from-silhouette method.

In an embodiment, generating the 3D shape volume includes:
  projecting a voxel of the scene volume on the silhouette images;
  determining a number of background votes for the voxel by counting the number of silhouette images for which the voxel is projected on background pixels; and
  determining that the voxel is part of the 3D shape volume if the number of background votes associated with the voxel is lower than a background threshold.

In an embodiment, the background threshold is predetermined.

In an embodiment, the probabilities of the 3D part probability volume are adjusted based on the 3D shape volume.

In an embodiment, a probability of a voxel of the 3D part probability volume is decreased if the number of determined background votes for the voxel is high.

In an embodiment, the probability of the voxel is set to zero if the the number of corresponding background votes is greater or equal to one.

In an embodiment, the method further comprises determining a 3D skeleton by graph construction based on the 3D part probability volume generated using a skeleton-based method.

In an embodiment, the background threshold for a voxel is dependent on the probability of that voxel to be part of the 3D skeleton.

In an embodiment, the background threshold is increased for voxels presenting a high probability of being part of the 3D skeleton.

In an embodiment, nodes of the graph are adjusted based on the 3D shape volume.

In an embodiment, nodes are removed from the graph based on their number of background votes.

In an embodiment, the graph construction for determining the 3D skeleton comprises determining weights of edges of the graph and wherein the weights are adjusted based on the 3D shape volume.

In an embodiment, the adjustment of the weights of the graph edges is based on the number of background votes.

In an embodiment, the method further comprises generating a 3D skeleton volume based on the 3D skeleton.

In an embodiment, the generating of the 3D representation of the 3D object is based on both the 3D shape volume and the 3D skeleton volume.

In an embodiment, the 3D representation corresponds to the intersection of the 3D shape and skeleton volumes.

In an embodiment, the plurality of source images of the scene volume are recorded substantially simultaneously by a plurality of source cameras.

According to another aspect of the invention, it is provided a computer program product for a programmable apparatus, the computer program product comprising a sequence of instructions for implementing a method according to the invention, when loaded into and executed by the programmable apparatus.

According to another aspect of the invention, it is provided a non-transitory computer-readable medium storing a program which, when executed by a microprocessor or computer system in a device, causes the device to perform the method according to the invention.

According to another aspect of the invention, it is provided a computer program which upon execution causes the method of the invention to be performed.

According to another aspect of the invention, it is provided a computer system for generating a 3D representation of a 3D real world object observed by source cameras in a scene volume, comprising at least one microprocessor configured for carrying out the steps of:
- obtaining from a memory of the computer system a plurality of source images of the scene volume recorded by one or more source cameras;
- executing on the obtained source images a step, of a skeleton-based method, for generating a 3D part probability volume, the 3D part probability volume comprising, for each part of the 3D object, a probability for a voxel of the scene volume to belong to that part;
- executing on the obtained source images a step, of a shape-from-silhouette method, for generating silhouette images of the 3D object compared to reference background images; and
- generating a 3D representation of the 3D object considering the generated 3D part probability volume and the silhouette images.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 10 schematically illustrates scalar products to compute weights for graph links;

FIGS. 12-a and 12-b illustrate embodiments where the weights used to generate a 3D skeleton are adjusted based on information from the 3D shape obtained by the shape from silhouette method;

DETAILED DESCRIPTION OF EMBODIMENTS

Figure 1:
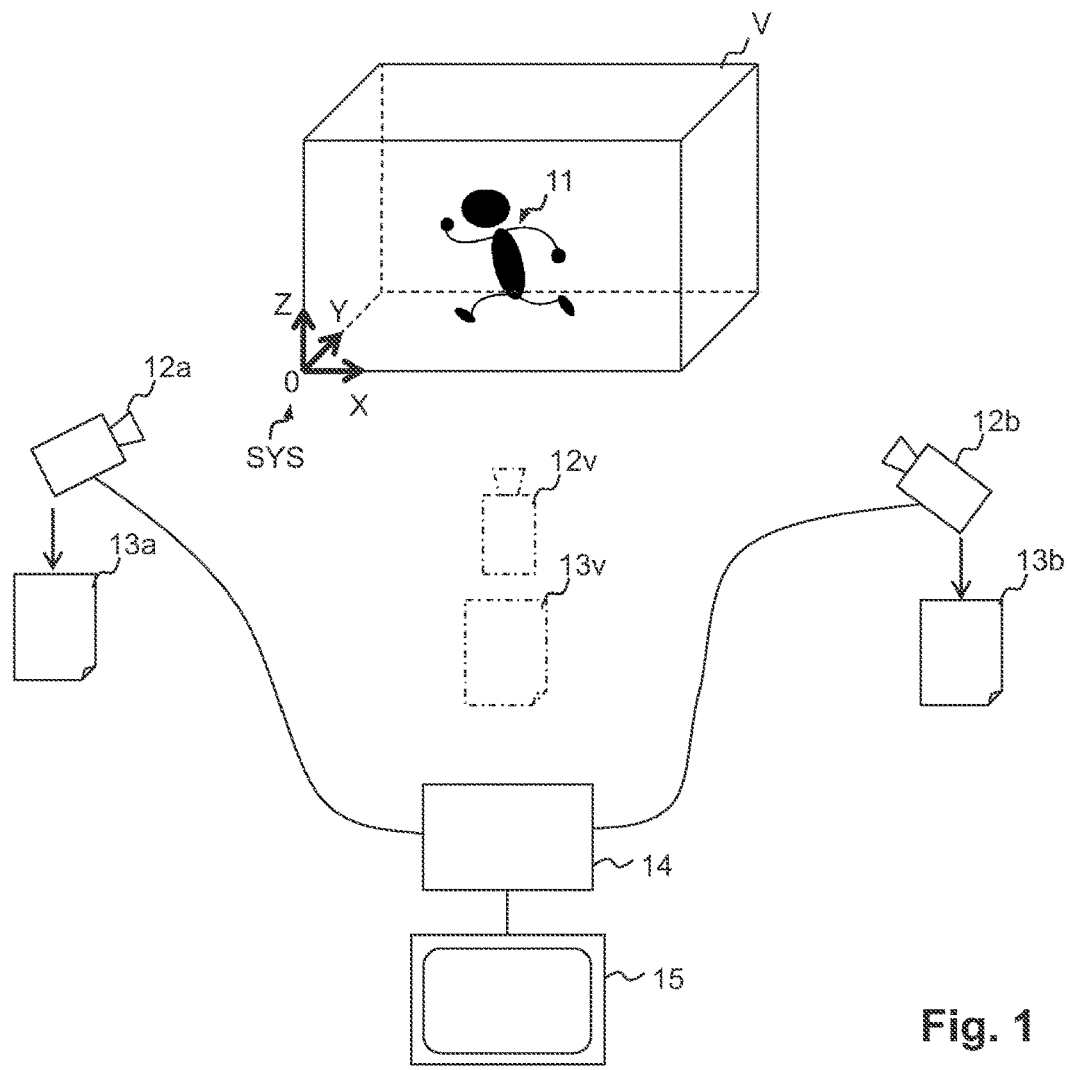
FIG. 1 is a general overview of a system 10 implementing embodiments of the invention.

FIG. 1 is a general overview of a system implementing embodiments of the invention. The system comprises a three-dimensional (3D) real world object 11 in a scene volume V surrounded by two or more source camera/sensor units 12$i$ (i represents here a camera index such as a or b illustrated in the Figure).

The 3D real world object 11 may be of various types, including beings, animals, mammals, human beings, articulated objects (e.g. robots), still objects, and so on. The scene captured may also include a plurality of 3D objects that may move over time.

Although two main camera units 12a, 12b are shown in the Figure, there may be more of them, for instance about 7-10 camera units, or up to about 30-50 camera units in a stadium. Each source camera/sensor unit 12i (12a, 12b) comprises a passive sensor (e.g. an RGB camera).

The source camera units 12i generate synchronized videos made of 2D source images 13i (i.e. views from the viewpoints of corresponding camera units 12i) of the scene at substantially the same time instant, i.e. simultaneous source images that are recorded substantially simultaneously. Substantially means that the time difference between the different source images 13i is lower than the time for the 3D scene to change. The time difference that can be accepted depends on the speed of the different objects in the scene. Embodiments of the invention may also be implemented in an alternate system (not illustrated) having a number of source camera units 12i lower than the needed number of viewpoints. This alternate system is mostly suitable for still 3D objects in the scene which allow reuse of a single source camera unit for recording videos 13i from different viewpoints.

The 3D positions and orientations of the source cameras 12i within a reference 3D coordinates system SYS are known. They are named the extrinsic parameters of the source cameras.

Also, the geometrical model of the source cameras 12i, including the focal length of each source camera and the orthogonal projecting position of the center of projection in the images 13i are known in the camera coordinates system. They are named the intrinsic parameters of the source cameras. The camera model is described with intrinsic parameters as a pinhole model in this description but any different model could be used without changing the means of the invention. Preferably, the source cameras 12i are calibrated so that they output their source images of the scene at the same cadence and simultaneously. The intrinsic and extrinsic parameters of the cameras are supposed to be known or calculated by using well-known calibration procedures. In particular, these calibration procedures allow the 3D object to be reconstructed into a 3D representation like a skeleton at the real scale and/or shape.

The source images 13i feed a processing or computer system 14 according to embodiments of the invention.

The computer system 14 may be embedded in one of the source camera 12i or be a separate processing unit. Any communication technique (including Wi-Fi, Ethernet, 3G, 4G, 5G mobile phone networks, and so on) can be used to transmit the source images 13i from the source cameras 12i to the computer system 14.

An output of the computer system 14 is a 3D representation for at least one 3D object of the scene. Preferably, a virtual image 13v built with the 3D representation generated, and showing the same scene with the 3D object or objects from a viewpoint of a virtual camera 12v is rendered on a connected display screen 15. Alternatively, data encoding the 3D representation (e.g. skeleton) generated may be sent to a distant system (not shown) for storage and display, using for instance any communication technique. Stored 3D representations may also be used in human motion analysis for video monitoring purposes for instance.

In the following, a skeleton based method developed by the inventors will be described in relation with FIGS. 2 and 4 to 10.

Figure 2:
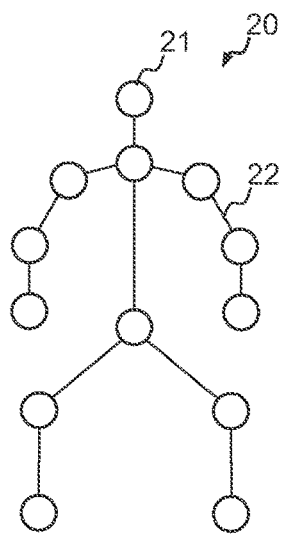
FIG. 2 illustrates an exemplary 3D model of a 3D real world object, based on which a 3D skeleton of the 3D object can be built.

FIG. 2 illustrates an exemplary 3D model 20 of a 3D real world object, on which a 3D skeleton of the 3D object may be built according to the teaching of embodiments of the present invention. In the example of the Figure, the 3D object is an articulated 3D real world object of human being type. Variants may regard still objects.

The 3D model comprises N distinct parts 21 and N-1 connecting elements or links 22. The parts 21 represent modeled portions of the 3D real world object, for instance joints (shoulders, knees, elbows, pelvis, . . . ) or end portion (head, hands, feet) of a human being. Each part 21 is defined as a point or "voxel" in the 3D coordinates system SYS. The connecting elements 22 are portions connecting the parts 21, for instance forearm, arm, thigh, trunk and so on. Each connecting element 22 can be represented as a straight line between the two connected parts, also named "adjacent parts", through 3D space.

To generate the 3D skeleton or skeletons of the scene volume, i.e. to know where each part of the 3D real world object or objects is 3D located within the scene volume V, an idea of the present invention consists in retrieving probabilities from the source images to detect parts of the 3D objects before merging them in 3D space. The merged probabilities can then be used to robustly detect the parts in the 3D space, i.e. in the scene volume V.

This approach advantageously reduces complexity of the 3D skeleton reconstruction, in particular of processes at 2D level (i.e. on the source images) including avoiding conflict resolutions to be performed between conflicting parts detected from different source images. It turns out that real time reconstructions (and thus displays or human motion analysis for instance) are better achieved. Real time reconstructions for "live" TV or broadcast purposes may include few seconds delay, e.g. less than 10 seconds, preferably at most 4 or 5 seconds.

The inventors have also noticed that it efficiently works on complex scenes (like sport events with multiple players in a stadium), with an ability to detect a wide number of interoperating 3D objects (e.g. multiple human players).

To that end, it is first obtained two or more simultaneous source images 13i of the scene volume V recorded by the source cameras 12i. They may be obtained from memory of the computer system.

The position and orientation of the scene volume V captured are known in the 3D coordinates system SYS (for instance the 3D shape is known, typically a cuboid or cube, and the 3D locations of four of its vertices are known).

Next, from each source image, one or more part maps are generated for one or more respective parts of the 3D real world object. If various parts are present in the 3D model 20, various part maps can be generated from the same source image. Each part map for a given part comprises part probabilities (e.g. an array of probabilities) for respective pixels of the source image representing probabilities, preferably a unary probability, that the respective pixels correspond to the given part.

Pixels of the source image are examples of "samples" forming an image. For ease of illustration, it is referred below to pixels, while the invention may apply to any sample. A sample may be for instance a pixel in the source image, a color component of a pixel in the source image, a group of pixels in the source image, a group of pixel color components in the source image, etc.

The generated part map may differ in size from the source image, usually at a lower resolution, in which case the part map can be up-sampled at the same resolution as the source image. In case of up-sampling, each part map can thus be a 2D array matching the source image (also a 2D array): a pixel in the part map for a given part (e.g. the head of the 3D human being) takes the probability that the co-located pixel in the source image belongs to such given part (i.e. head in the example). In case of lower resolution part map, a pixel in the part map for a given part may take the probability that a relatively (given the scale) co-located pixel in the source image belongs to such given part or that a group of relatively (given the scale) co-located pixels in the source image belong to such given part.

For ease of illustration, it is considered below that the part maps are of the same size as the source image, although the up-sampling process is optional.

In some embodiments, the part map may be filtered by a low-pass filter to extend the influence area of some detected parts when part maps generate strongly localized probabilities. For example, Gaussian filtering may be used. This approach improves the process, in particular the actual detection of parts as described below.

From these part maps, one or more sets of part volume data are also generated for respectively the one or more parts. In this method, generating a set of part volume data for a respective part includes:

projecting elementary voxels of the scene volume onto projection pixels of the part maps. It means that the scene volume V is split into elementary voxels, preferably each elementary voxel representing a cube whose edge length depends on the 3D object (e.g. 1 cm for human beings). Also, the projection matches each elementary voxel with the pixel (referred to as "projection pixel") of the source image or part map which represents it (i.e. the pixel which views the elementary voxel from the source camera point of view). This matching is a pure geometrical issue based on known intrinsic and extrinsic parameters; and computing a joint part probability, preferably a unary probability, for each elementary voxel based on the part probabilities of its projection pixels in the part maps corresponding to the respective part. This probability is said to be "joint" because it merges, and thus joins, several probabilities coming from several part maps for the same part. Examples of probability merging are proposed below. The set of joint part probability forms part "volume data" as it can be stored in memory as a 3D matrix matching the scene volume matrix (split into elementary voxels): a voxel in the part volume data for a given part (e.g. the head of the 3D human being) takes the joint probability that the co-located voxel in the scene volume V belongs to such given part (i.e. head in the example). If various parts are present in the 3D model 20, various sets of part volume data can thus be generated.

The part volume data may also be filtered by a filter to keep the highest joint part probabilities in order to improve part detection. Such joint part probabilities spread over the scene volume for a given part can then be used to determine the actual occurrence or occurrences of said part in the scene volume (in terms of identification and location). It means that one or more parts of the 3D skeleton can be generated using the one or more set of part volume data generated, for example, where the joint probabilities are locally the highest (local maxima).

As mentioned above, an exemplary application for the present invention may relate to the display of a virtual image 13v showing the same scene from a new viewpoint, namely a virtual camera 12v. To that end, the invention also provides a method for displaying a 3D skeleton of a 3D real world object observed by source cameras in a scene volume. This method includes generating a 3D skeleton of the 3D real world object using the generating method described above.

Next, this application consists in selecting a virtual camera viewing the scene volume and displaying the generated 3D skeleton from the virtual camera on a display screen. In practice, several generated 3D skeletons are displayed simultaneously on the display, for instance when displaying a sport event. A simple 3D object as shown in FIG. 2 can be used to display the generated 3D skeleton. This is useful to display animations that require low rendering costs. More promising applications can also provide an envelope to the 3D skeleton with a texture, either predefined or determined from pixel values acquired by the source cameras (for better rendering). This is for example to accurately render shot or filmed sportsmen as they actually look like in the scene volume.

Selecting a virtual camera may merely consist in defining the extrinsic and intrinsic parameters of a camera, thereby defining the view point (i.e. distance and direction from the scene volume) and the zoom (i.e. focal) provided by the virtual image.

Generating the 3D skeletons and displaying/rendering them on the display screen 15 may be performed for successive source images 13i acquired by the source cameras 12i. Of course, the displaying is made following the timing of acquiring the source images. It turns out that 3D-skeleton-based animations of the captured scene can be efficiently produced and displayed.

Other applications based on the generated 3D skeleton or skeletons may be contemplated. For instance, video monitoring for surveillance purposes of areas, such as the street or a storehouse, may perform detection of 3D skeletons in captured surveillance images and then analyses the moving of these 3D skeletons to trigger an alarm or not.

Figure 3:
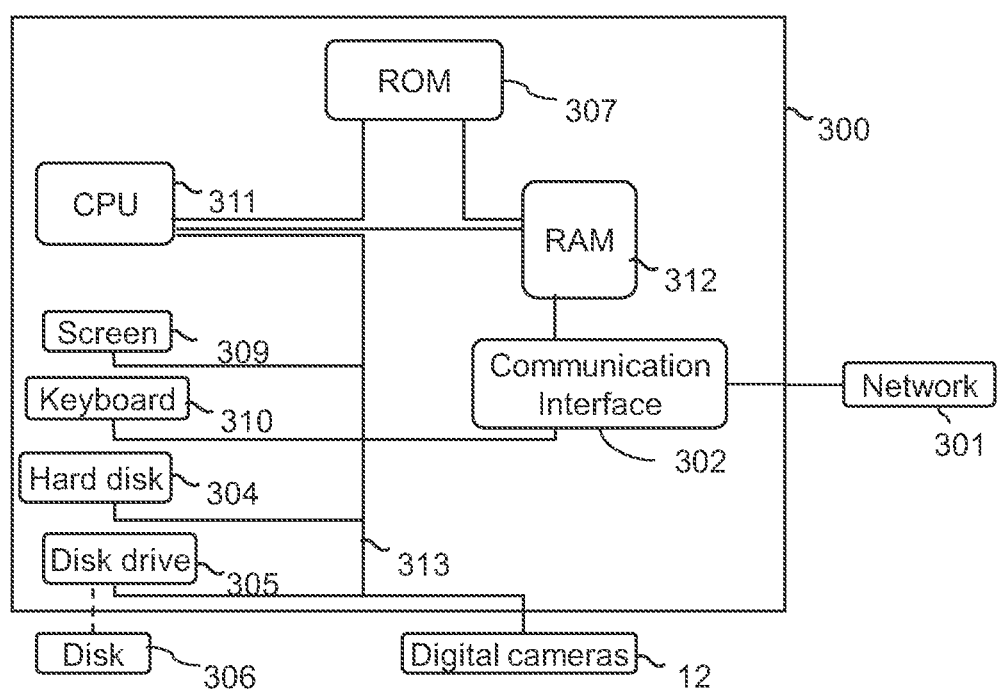
FIG. 3 is a schematic block diagram of a computing device for implementation of one or more embodiments of the invention.

FIG. 3 schematically illustrates a device 300 used to implement embodiments of the present invention, for instance the above-mentioned computer system 14. It is preferably a device such as a micro-computer, a workstation or a light portable device. The device 300 comprises a communication bus 313 to which there are preferably connected:

- a central processing unit 311, such as a microprocessor, denoted CPU;
- a read only memory 307, denoted ROM, for storing computer programs for implementing the invention;
- a random access memory 312, denoted RAM, for storing the executable code of methods according to the invention as well as the registers adapted to record variables and parameters necessary for implementing methods according to embodiments of the invention; and
- at least one communication interface 302 connected to a communication network 301 over which data may be transmitted.

Optionally, the device 300 may also include the following components:

- a data storage means 304 such as a hard disk, for storing computer programs for implementing methods according to one or more embodiments of the invention;
- a disk drive 305 for a disk 306, the disk drive being adapted to read data from the disk 306 or to write data onto said disk;
- a screen 309 for displaying data and/or serving as a graphical interface with the user, by means of a keyboard 310 or any other pointing means.

The device 300 may be connected to various peripherals, such as for example source cameras 12i, each being connected to an input/output card (not shown) so as to supply data to the device 300.

Preferably the communication bus provides communication and interoperability between the various elements included in the device 300 or connected to it. The representation of the bus is not limiting and in particular the central processing unit is operable to communicate instructions to any element of the device 300 directly or by means of another element of the device 300.

The disk 306 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may optionally be stored either in read only memory 307, on the hard disk 304 or on a removable digital medium such as for example a disk 306 as described previously. According to an optional variant, the executable code of the programs can be received by means of the communication network 301, via the interface 302, in order to be stored in one of the storage means of the device 300, such as the hard disk 304, before being executed.

The central processing unit 311 is preferably adapted to control and direct the execution of the instructions or portions of software code of the program or programs according to embodiments of the invention, which instructions are stored in one of the aforementioned storage means. On powering up, the program or programs that are stored in a non-volatile memory, for example on the hard disk 304 or in the read only memory 307, are transferred into the random access memory 312, which then contains the executable code of the program or programs, as well as registers for storing the variables and parameters necessary for implementing embodiments of the invention.

In a preferred embodiment, the device is a programmable apparatus which uses software to implement the invention. However, alternatively, the present invention may be implemented in hardware (for example, in the form of an Application Specific Integrated Circuit or ASIC).

Various embodiments of the present skeleton based method are now described with reference to FIGS. 4 to 10.

Figure 4:
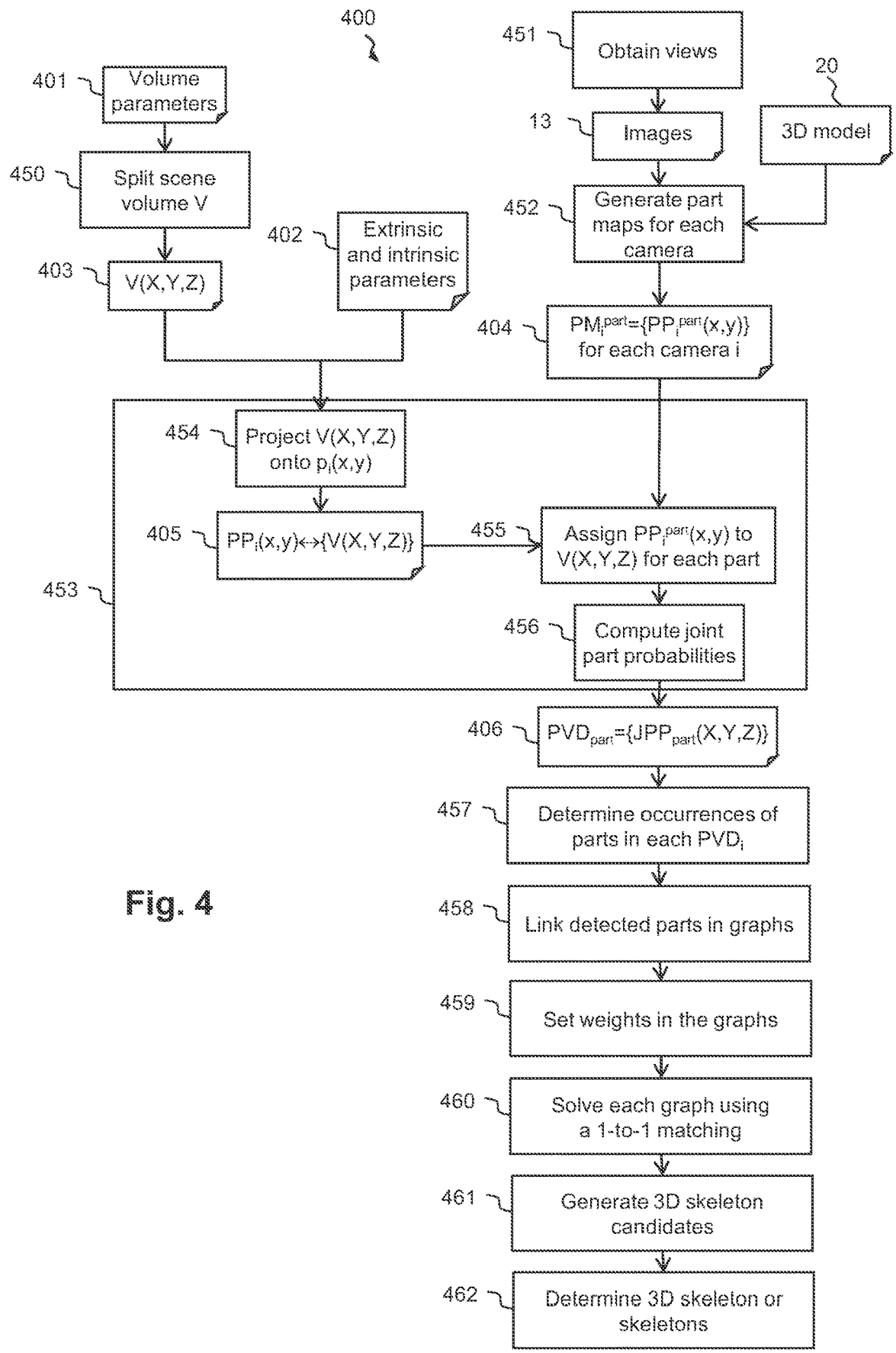
FIG. 4 illustrates, using a flowchart, first embodiments of a method for generating a 3D skeleton of a 3D real world object observed by source cameras in a scene volume.

FIG. 4 illustrates, using a flowchart, first embodiments of a skeleton based method. The method takes place in the computer system 14 which has previously received M source images 13i acquired simultaneously by M calibrated source cameras 12i, for instance through a wireless or a wired network. These source images 13i are for instance stored in a reception buffer (memory) of the communication interface 302. The method 400 may be repeated for each set of M simultaneous source images 13i received from the source cameras 12i for each successive time instants. For instance, 25 Hz to 100 Hz source cameras may be used, thereby requiring processing the set of source images 13i each $1/100$ to $1/25$ second.

The scene volume V viewed by the source cameras 12i is predefined as shown by the volume parameters 401. These parameters position the scene volume in the coordinates system SYS.

The source cameras 12i have been calibrated, meaning their extrinsic and intrinsic parameters 402 are known.

The nature, and thus the 3D model 20, or each 3D real world object 11 in the scene volume V is known. For ease of explanation, the description below concentrates on a single type of 3D object, for instance a human being as represented in FIG. 2. Where the scene volume V contains various types of 3D objects, various corresponding 3D models 20 can be used using the teachings below.

Figure 5:
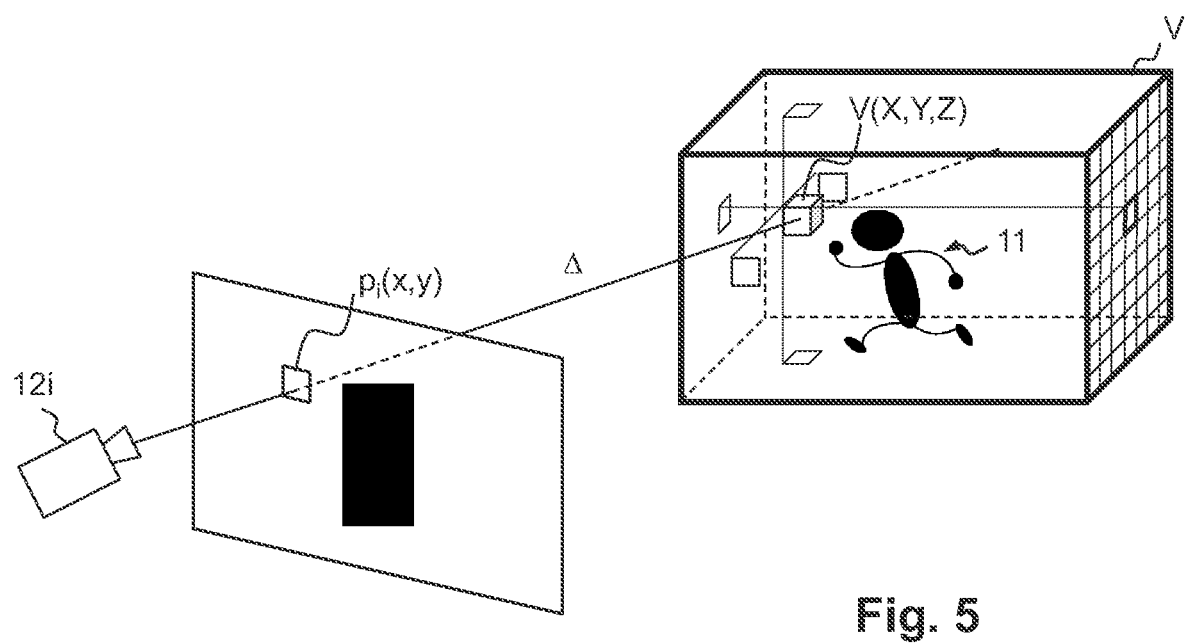
FIG. 5 schematically illustrates the splitting of a cuboid into elementary cubes V(X,Y,Z) and an exemplary projection of the latter on a part map according to embodiments of the invention.

The method starts with the splitting 450 of the scene volume V into elementary voxels V(X, Y, Z) 403, preferably of equal sizes, typically elementary cubes. A size of the elementary voxels may be chosen depending on the 3D object to be captured. For instance, the edge length of each elementary voxel may be set to 1 cm for a human being. FIG. 5 schematically illustrates the splitting of a cuboid into elementary cubes V(X, Y, Z), only one of which being shown for the sake of clarity.

The splitting 450 may be made once and for all, meaning it is made once and the same split is used for successive sets of source images captured at successive time instants.

The method also starts with the obtaining 451 of two (or more) simultaneous source images of the scene volume recorded by the source cameras. The source images 12i are for instance retrieved from the reception buffer of the communication interface 302.

Although the sources images may have different sizes from one source camera to another, it is assumed all source images have the same size for illustration purposes. If some source images have different sizes, they may be resized. Note however that the resizing is not mandatory and it is meant for simplifying the description; embodiments of the invention can still be applicable if not all source images have the same size.

From each of these source images 13i, one or more part maps $PM_i^{part}$ 404 are generated at step 452 for one or more respective parts 21 of the 3D real world object 11. Typically, N part maps are generated (N being the number of parts in the considered 3D model 20). For illustrative purposes, the part map generated for the head (as a part of the 3D object 11) from source image '3' is referenced $PM_3^{head}$.

Each part map $PM_i^{part}$ comprises part probabilities $PP_i^{part}$(x,y) for respective pixels of the source image 'i'. $PP_i^{part}$(x, y) represents a probability that the respective pixel in the source image $13_i$ corresponds to the respective part 'part' of the 3D real world object. If the part map and the image source have the same sizes, the respective pixel is a pixel at location (x,y) in the source image. Otherwise, it is the relatively (given the scale or sampling factor) co-located pixel. For instance, it may be pixel at location (2x, 2y) when the height and width of the part map are half those of the image source.

The part map can be stored as an image having the same size as the source image, wherein each pixel takes the value of the part probability for the collocated pixel in the source image. Therefore, there is a direct matching between a source image and the part maps generated from it: the collocated pixels in the part maps correspond to respective probabilities of the collocated pixel in the source image 13i to represent a respective part of the 3D object as shown by the camera 12i.

The part maps may have a different size/resolution than the source images (e.g. they are sub-sampled compared to the size of the source image). In such a case, the intrinsic parameters of the cameras can be modified considering the sub-sampling factor. Another solution consists in interpolating the part maps in order to match the genuine size of the source images. In such a case, a bilinear interpolation is preferred over a nearest-neighbor or bi-cubic interpolation.

In an improved solution, the parts maps may be low-pass filtered in order to increase the areas of influence of 2D pixels. For example, Gaussian filtering may be used.

In the example of FIG. 2, thirteen parts are composing the 3D model, thereby thirteen part maps are generated from each source image processed.

Known techniques can be used to produce these part maps from the source images 13i.

One technique is described in publication "*Realtime Multi-Person 2D Pose Estimation using Part Affinity Fields*" by Zhe Cao et al. (2016). This technique calculates confidence maps for part detection, which bear probabilities at pixel level as defined above.

Another technique is described in publication "Deeper-Cut: A Deeper, Stronger, and Faster Multi-Person Pose Estimation Model" by Eldar Insafutdinov et al. (2016).

More generally, a convolutional neural network (CNN) can be used which is configured based on a learning library of pictures in which a matching with each part of the models has been made. The running of configured CNN on the source images then identifies occurrences of the parts within input source images. An advantage of the CNNs is that the same running of the CNN can identify, within an input image, parts from different models, provided the CNN has been trained with learning pictures embedding the various models to be searched.

Typically, the part probabilities generated are unary, i.e. set between 0 and 1.

These known techniques are dependent on the set of learning pictures to train the CNN. To that aim, the learning pictures usually provide exemplary objects that have bounded sizes. These techniques are badly adapted to detect objects the size of which is not of the same order of magnitude than in the learning pictures. Indeed, 3D objects can be sometimes big, sometimes tiny. This is for instance the case during sport events where players move from very close to the camera to very far.

In embodiments seeking to increase robustness, it is thus proposed to improve these known techniques to produce the part maps. An idea is to use scaled versions of the same source image to increase chances to have high part probabilities.

To that end, one or more scaled versions of a given source image 13i are obtained.

For instance, a half-sized image (scale 0.5) is generated (through down-sampling) as well as a double-sized image (scale 2—through up-sampling). Known scaling techniques can be used.

Of course, other scaling values can be used. In this example, at least one up-scaled version and one downscaled version of the source image are obtained and used. In variants, only up-scaled versions or only downscaled versions are used.

Next, an intermediary part map is generated for the part currently considered, from each of the source image and its scaled versions. This operation is made using any of the above-mentioned known techniques. Thus, the intermediary part map comprises part probabilities for respective pixels of the source image or its scaled version (possibly each pixel if the intermediary part map has the same dimensions as the images), which part probabilities represent probabilities that the respective pixels in the source image or scaled version correspond to said part currently considered.

As the generated part maps are not at the same scale, they are then preferably rescaled at a unique and same scale. For instance, an intermediary part map obtained from an up-scaled source image is downscaled (using the inversed scaling factor), meaning for instance that a part probability out of 2 is discarded (for a half scaling). In addition, an intermediary part map obtained from a downscaled source image is up-scaled (using the inversed scaling factor), meaning for instance that a part probability for a new pixel is determined for instance from the part probabilities of neighboring pixels (e.g. through interpolation).

The obtained (rescaled at the same scale) intermediary part maps are then used to generate the part map for said source image and the part currently considered. In particular, the part map is preferably formed with, for each pixel considered, the highest part probability from the part probabilities of the generated intermediary part maps at the same pixel considered.

For instance, for a pixel (x, y) in the source image having corresponding part probabilities calculated from the source image and its scaled versions, the highest probability between the part probability for pixel (x, y) in the part map obtained from the source image, the part probability for pixel (x, y) in the part map obtained from a first downscaled version of the source image, the part probability for pixel (x, y) in the part map obtained from a first up-scaled version of the source image, so on, is selected to be the part probability associated with pixel (x, y) in the final part map output at step 452.

Knowing the part maps $PM_i^{part}$ and the scene volume V split into elementary voxels V(X, Y, Z), the computer system 14 can generate at step 453 one or more sets of part volume data for respectively the one or more parts. In fact, one set is generated for each part 21.

Step 453 aims at obtaining, for each part, a 3D space corresponding to the scene volume wherein each elementary voxel bears (for instance by its value) the probability that the collocated voxels in V belongs to said part. This probability is built from the part probabilities obtained from the various source images 13i.

For the example of FIG. 2, thirteen 3D spaces are built (i.e. thirteen sets of part volume data).

To do so, step 453 comprises two substeps.

First, the elementary voxels V(X, Y, Z) of the scene volume are projected at step 454 onto projection pixels $p_i(x, y)$ of the part maps (which may all matches corresponding source images). FIG. 5 schematically illustrates such projection. This is a geometrical issue, which depends only on the extrinsic and intrinsic parameters of each source camera 12i, given the elementary voxels considered.

As the scale/resolution of the part maps may differ from the one of the source image, the projection may consist in projecting the voxels according to the intrinsic and extrinsic parameters of the source images/cameras and in scaling the obtained 2D coordinates according to the scaling factor.

The projection may however be direct (i.e. without scaling) if the part maps have already been interpolated/up-sampled at the same scale as the source image beforehand.

Each pixel $p_i(x, y)$ captured by the source camera 12i corresponds to one elementary voxel along the line Δ. All the elementary voxels of the scene volume V along this line are projected onto the same pixel. On the other way, an elementary voxel may project onto one or more pixels of the source images or part maps.

One may note that a given source camera may not view the whole scene volume V, but only a part of it, depending on how V is defined. Thus, some elementary voxels may not be projected on a projection pixel of some source images (and thus part maps). The source images on which an elementary voxel can be projected are named below "projecting images for the voxel".

Step 454 thus matches the pixels $p_i(x, y)$ of the source images $12_i$ (and thus of each part maps generated from them) with the elementary voxels V(X, Y, Z). The matching is shown as reference 405 in the Figure. A majority of pixels $p_i(x, y)$ is matched with respective sets of elementary voxels V(X, Y, Z), the number of which may vary depending on whether they are viewed by the cameras. Some pixels may be matched with few elementary voxels, even zero (if not viewed by any camera considered).

Next, using this matching, each part probability $PP_i^{part}(x, y)$ at a pixel in a part map $PM_i^{part}$ is assigned, at step 455, to the elementary voxel or voxels (if any) that are projected on this pixel $p_i(x, y)$. In other words, each elementary voxel is associated with the part probabilities taken by its projection pixels in the part maps. This may be made part by part, thereby generating N 3D spaces corresponding to the N parts, wherein each elementary voxel is associated with usually M map probabilities (M being the number of cameras considered).

Next, a joint part probability $JPP_{part}(X, Y, Z)$ can be computed at step 456 for each elementary voxel V(X, Y, Z) based on these assigned part probabilities. Thus, N volumes or part volume data $PVD_{part}$ 406 can be generated for the N parts, each volume representing the distribution of probabilities that the elementary voxels belong to the respective part considered.

In one embodiment, computing the joint part probability $JPP_{part}(X, Y, Z)$ for an elementary voxel (X, Y, Z) may include dividing the sum of the part probabilities of its projection pixels in the part maps corresponding to the respective part, by the number of such part maps. It means the sum of the assigned part probabilities $PP_i^{part}(x, y)$ is computed, which sum is next divided by the number of projecting images for the voxel. This ensures the joint part probability to remain between 0 and 1.

The following of the method consists in generating one or more parts of the 3D skeleton using the one or more sets of part volume data $PVD_{part}$ so generated. These generated one or more parts thus build the 3D skeleton.

The generation comprises various steps as described now.

First, a set of part candidate or candidates is determined at step 457 from each part volume data $PVD_{part}$. Each part candidate corresponds to an elementary voxel. The determination is made based on the joint part probabilities associated with the elementary voxels. For instance, part candidate or candidates from part volume data are determined by determining local maximum or maxima of the joint part probabilities (within data $PVD_{part}$) and outputting (i.e. selecting) elementary voxel or voxels (the part candidate or candidates) corresponding to the determined local maximum or maxima.

All 3D local maximum or maxima in each part volume data $PVD_{part}$ may be selected. They identify candidates in the scene volume for the part considered.

In one embodiment, only the highest local maximum is selected or the α highest local maxima are selected (α integer >1) for instance if the maximal number α of 3D objects in the scene volume is known in advance. This makes the process less complex as only few part candidates are handled for the next steps.

In another and refining embodiment, a probability threshold can be used to keep only the 3D local maximum or maxima that are associated with joint part probabilities above said threshold. This cleans up the set of part candidates from any uncertain part candidates that would result from isolated part detection at step 452 (i.e. from few or very few source images). Consequently, the process is simplified. A probability threshold can be defined independently for each part or for a subset of parts. This is because the method used at step 452 may be more efficient to detect some parts than other parts.

In yet another embodiment, 3D local maximum or maxima that are too close (given a guard threshold) to the envelope (faces) of the scene volume V are discarded. This is to avoid processing 3D objects 11 that may not have been entirely captured (and thus possibly truncated).

At least two sets (usually N sets) of part candidate or candidates are thus obtained from respectively the part volume data corresponding to two (usually N) parts, each part candidate corresponding to an elementary voxel with an associated joint part unary probability, Next, a one-to-one association between a first part candidate (e.g. a candidate for a head) of a first candidate set and a second part candidate (e.g. a candidate for a neck) of the second candidate set is made. This is done using a graph wherein nodes correspond to the part candidates of the two sets with their associated joint part probabilities and weighted links between nodes are set.

For ease of illustration, it is considered here that the graph is built based on only two parts that are adjacent according to the 3D model 20. This is a simplification of more complex approaches, which are based on graphs involving a higher number of parts. In variant, more complete graphs may thus also be used to find one-to-one associations, as explained below.

The one-to-one association requires a first step 458 of linking the part candidates one to the other. This step may take into account the adjacency between parts according to the 3D model 20, i.e. the existence of connecting element 22 in the model. For instance, a head candidate can be connected or linked to a neck candidate in the 3D model 20.

Thus, each pair of adjacent parts in the 3D model 20 may be successively considered.

In one embodiment, all part candidates for the first adjacent part are connected to each and every part candidate for the second adjacent part. This can be made through the building of a graph as introduced above. One graph is built per each pair of adjacent parts wherein the nodes correspond to the part candidates (i.e. voxels) for the two adjacent parts and a link between the nodes is created where part connection is made. Each node is thus assigned the joint part probability corresponding to the corresponding part candidate (voxel).

To reduce complexity, a link between two nodes is preferably set in the graph depending on morphological constraints defined by the 3D model between the two adjacent parts. For instance, decision to connect two part candidates (and thus corresponding nodes in the graph) may be based on a distance between the part candidates, given predefined (morphological) constraints.

The constraints may vary from one part to the other. For instance, a common head-neck distance is higher than 10 cm but less than 40 cm, a common pelvis-knee distance is higher than 20 cm but less than 80 cm, and so on.

Consequently, part candidates for two adjacent parts are thus preferably connected if their relative distance (in the 3D coordinates system SYS) meets the morphological constraints, e.g. is higher than a predefined floor threshold and/or less than a predefined ceiling threshold. The floor threshold helps distinguishing between intermingled 3D objects while the ceiling threshold helps processing separately distant 3D objects.

In a slight variant where all part candidates for the first adjacent part are first connected to each and every part candidate for the second adjacent part, the morphological constraints may be used to remove links linking two part candidates not satisfying the constraints.

Once the graphs for all pairs of adjacent parts have been obtained (steps 458 to 460 may however be performed one pair after the other), each link between two connected nodes is weighted at step 459. It means a weight is assigned to the link in the graph.

In one embodiment, a weight for such a link between two nodes corresponding to part candidates of the two sets depends on a distance between the two part candidates. In a rough approach, the inverse of the distance (as measured between the two part candidates in the 3D coordinates system SYS) is used as a weight.

Next, each graph is solved at step 460 to find the one-to-one associations between part candidates that maximize a cost or energy.

The one-to-one associations mean that, at the end, each node (for a first adjacent part) in the graph can only be linked to at most one other node (for the second part). After being solved, the graph may comprise nodes without links. This is the case for instance when the set of part candidates for the first adjacent part includes more candidates than the set for the other adjacent part in the pair.

For instance, a bipartite solving of the graph reduces to a maximum weight bipartite graph matching problem as explained for instance in "*Introduction to graph theory, volume 2*" by D. B. West et al. (2001). The optimal associations between the parts give portions of 3D skeletons.

The energy E to maximize may be the sum of elementary energies assigned to the pairs of connected nodes respectively. Each elementary energy 'e' may be based on the joint part probabilities associated with the two nodes and on the weight of the link between the nodes:

$$E = \Sigma e$$

where for instance $e = \beta \cdot [JPP_{part-1}(\text{first node}) + JPP_{part-2}(\text{second node})] + \gamma \cdot \text{weight}_{link}$ and $\beta$ and $\gamma$ are predefined parameters.

In an alternative and more efficient way, the energy can be defined as:

$$e = \beta \cdot \max\{JPP_{part-1}(\text{first node}), JPP_{part-2}(\text{second node})\} + \gamma \cdot \text{weight}_{link}$$

For instance, let consider two connected nodes in the graph corresponding to a head candidate and to a neck candidate respectively. The head candidate has a joint part probability $JPP_{head}(X_1, Y_1, Z_1)$ while the neck candidate has $JPP_{neck}(X_2, Y_2, Z_2)$. The two candidates $(X_1, Y_1, Z_1)$ and $(X_2, Y_2, Z_2)$ are 0.15 meter apart in system SYS, in which case the weight for the link between the two nodes is set to 1/0.15. Their associated elementary energy is the following in the first example of energy above:

$$e = \beta \cdot [JPP_{head}(X_1, Y_1, Z_1) + JPP_{neck}(X_2, Y_2, Z_2)] + \gamma/0.15$$

The result of step 460 is a set of one-to-one-associated part candidates (there may be a single association in the set) for each graph (i.e. for each pair of adjacent parts according to the 3D model 20). Indeed, the above steps of determining part candidates (457) and of obtaining one-to-one associations (458-460), are repeated for the plurality of pairs of adjacent parts.

The above description of step 460 is based on a one-to-one graph simplification between adjacent part candidates. Some alternatives to this graph simplification exist.

For example, it is possible to construct a complete graph/tree between each head candidates and each right hand candidates passing through the neck candidates, right shoulder candidates and right elbow candidates. This tree can be segmented in a second step into independent sub-trees, each sub-tree defining a unique path between adjacent skeletons parts. The construction of the sub-tree can be viewed as a graph segmentation.

A global solution of this segmentation is the one that maximizes the total energy of the independent sub-trees.

This process of segmentation/subtree generation can be repeated for three other complete trees between respectively head candidates and right foot candidates (passing through intermediary parts), head candidates and left hand candidates, and head candidates and left foot candidates. More generally, if the 3D model has P ending parts, P−1 complete trees may be built and then solved.

The final steps consist in selecting one-to-one-associated part candidates so obtained as parts of the final 3D skeleton.

Preferably, a first step 461 consists in connecting one-to-one-associated part candidates of two or more pairs of adjacent parts to obtain candidate 3D skeleton or skeletons. A connected component algorithm can be used.

This idea is merely to use each graph output to parse (thus build) the candidates 3D skeleton.

The output of a first graph is selected from which the one-to-one associations (of adjacent part candidates) are successively considered. Given an associated pair of adjacent part candidates, the outputs of the other graphs (preferably those involving one of the parts previously considered) are used to determine whether or not these adjacent part candidates are also one-to-one associated with other part candidates. In the affirmative, the various part candidates are put together in the same data structure in memory, which progressively forms a candidate 3D skeleton. And so on.

To illustrate this process still using the model of FIG. 2, let consider a first association between a head candidate (voxel or "point" P1 in the scene volume) and a neck candidate (voxel or "point" P2 in the scene volume). This association results from the solving of the head-neck graph. The solved left-shoulder-neck graph is used to determine whether an association between the same neck candidate (P2) and a left-shoulder candidate exist. In the affirmative (voxel or "point" P3 in the scene volume for the left-shoulder candidate), points P1, P2, P3 are put together in a candidate structure.

And so on with the left-elbow-left-shoulder graph, left-hand-left-elbow graph, right-shoulder-neck graph, pelvis-neck graph, and so on . . . . At the end, at most thirteen points P1-P13 in the 3D space may have been found which form an entire 3D skeleton candidate.

A second association between a head candidate and a neck candidate may produce a second 3D skeleton candidate, be it entire (if all the graphs provide a new point) or not.

It turns that one or more (entire or partial) 3D skeleton candidates are formed. A 3D skeleton candidate may be made of a single isolated one-to-one association between two part candidates or of few associations.

In the graph segmentation approach described above where P−1 complete trees are built and then solved, the final stage may consist in merging together the four (more generally P−1) sub-trees (if any) sharing the same candidate for starting end part (here for instance the head). This also provides a 3D skeleton candidate for each occurrence of an end part (e.g. head, hand, foot) of the 3D model.

From these 3D skeleton candidates obtained, one 3D skeleton candidate may be selected as a 3D skeleton of the 3D object 11. This is step 462. Of course, if a plurality of 3D objects having the same 3D model 20 is present in the scene volume, a plurality of 3D skeleton candidates is selected as 3D skeletons for these objects. The number of 3D skeleton candidates to be selected can be known in advance. However, some applications may not know such number.

Apart from such known number, various criteria may be used alternatively or in combination to select the 3D skeleton candidates. The criteria increase the relevancy of the selection (i.e. the selected candidates correspond to existing objects in the scene volume).

A first criterion is a number of parts forming the 3D skeleton candidate according to the 3D model. One easily understands that a more complete skeleton candidate is a better candidate than a more partial skeleton candidate. Thus, preferably, the number should be above a predefined threshold to select (or keep) the 3D skeleton candidate. This is to avoid having too partial 3D skeletons, and it automatically discards the isolated one-to-one associations (or the 3D skeleton candidates made of few associations). This first criterion is similar to a number of connecting elements in the 3D skeleton candidate.

A second criterion is the joint part probabilities associated with the nodes of the 3D skeleton candidate in the graph or graphs. Again, one easily understands that the highest the joint part probabilities, the more accurate the 3D skeleton candidate. Thus, a sum of these probabilities should preferably be above a predefined threshold to select (or keep) the 3D skeleton candidate. This discards the 3D skeleton candidates that are based on uncertain part detections from the source images.

A third exemplary criterion is the weights set for the links between the nodes of the 3D skeleton candidate in the graph or graphs. For instance, a sum of these weights should be above a predefined threshold to select (or keep) the 3D skeleton candidate. This criterion may be additional to the first one, since such weight sum is strongly impacted by the number of parts (the fewer the number of parts and thus of links, the few the number of weights to be summed).

A fourth criterion is the visibility of the 3D skeleton candidate by the source cameras 12i. Such visibility can be expressed as the number of projecting images for the voxels composing the candidate, i.e. the number of source images onto which the 3D skeleton candidate can be projected. For instance, such number (or visibility) should be above a predefined number, e.g. half the number of source cameras, to select (or keep) the 3D skeleton candidate.

Some applications may require that the 3D skeleton or skeletons selected at step 462 (thus generated using the process of the Figure) be displayed, for instance using the display screen 15.

Figure 6:
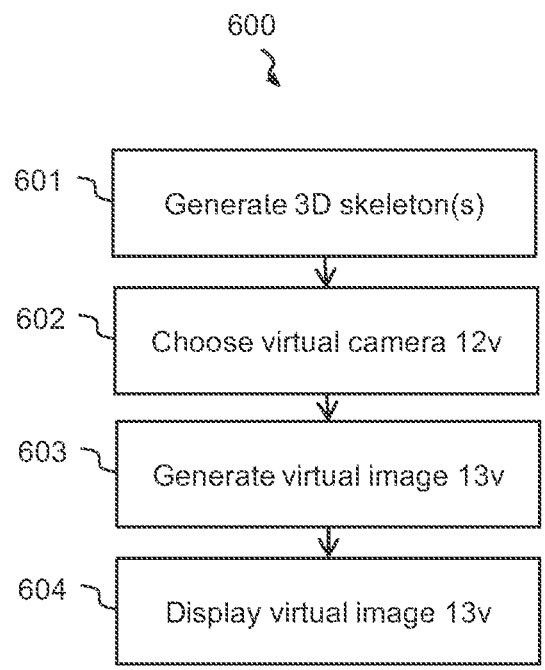
FIG. 6 illustrates, using a flowchart, a process for displaying a 3D skeleton of a 3D real world object observed by source cameras in a scene volume according to embodiments of the invention.

FIG. 6 illustrates, using a flowchart, such a process 600 for displaying a 3D skeleton of a 3D real world object observed by source cameras in a scene volume. This is an exemplary application using the generated 3D skeleton.

Step 601 corresponds to generating a 3D skeleton of the 3D real world object using the teachings of the method, e.g. using the process of FIG. 4.

Step 602 consists in selecting a virtual camera 12v viewing the scene volume. Such camera does not actually exist. It is defined by a set of extrinsic and intrinsic parameters chosen by the user. These parameters define from which viewpoint, at which distance and with which focal (i.e. zoom) the user wishes to view the scene.

Using these parameters of the virtual camera, the virtual image 13v can be computed at step 603. This step merely consists in projecting the 3D skeleton or skeletons located in the 3D space onto a virtual empty image defined by the parameters of the virtual camera. This projection is similar to step 454 where the elementary voxels (here the voxels forming the 3D skeleton) are projected onto the source images. Next, the built virtual image 13v is displayed on the display screen 15 at step 604.

Steps 603 and 604 ensure the display on a display screen of the generated 3D skeleton from the viewpoint of the virtual camera.

Figure 7:
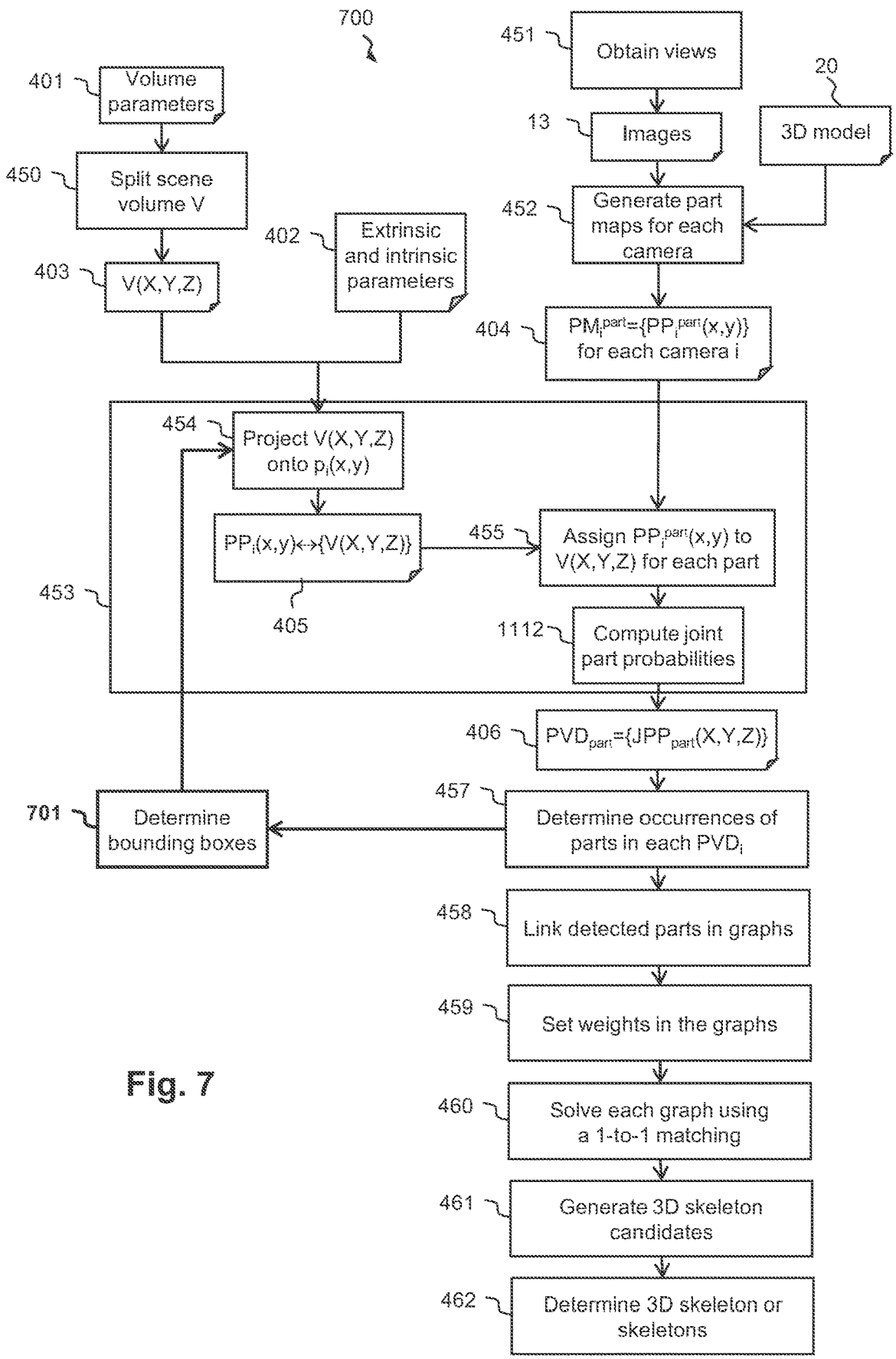
FIG. 7 illustrates, using a flowchart, second embodiments of a 3D skeleton generating method.

FIG. 7 illustrates, using a flowchart, second embodiments, which improve the first embodiments described above, of the method. Similar references are used between FIGS. 4 and 7 for the same steps or data.

In step 454 of FIG. 4, the elementary voxels V(X,Y,Z) of the scene volume are projected onto projection pixels $p_i$(x, y) of the part maps (which may match in size their respective source image or not). The number of projections may be very high since it depends on the number of elementary voxels forming the scene volume (which may be huge to cover e.g. a sport field in stadium) and on the number of part maps, i.e. on the number of source images 13i (tens of cameras may be used), on the number of 3D models 20 to be found and on the number of parts 21 forming each 3D models 20.

The process 700 of FIG. 7 aims at substantially reducing this number of projections, thereby reducing computational costs of the method.

The improvement relies on the following idea: using a first set of part volume data, i.e. $PVD_{head}$ 406 for instance, to restrict a number of elementary voxels to be projected (during step 454) on part maps (generated for a second part, e.g. neck) to generate 453 a second set of part volume data, $PVD_{neck}$ for instance. In fact, the processing of the first set of part volume data $PVD_{head}$ makes it possible to identify parts candidates and thus to roughly define sub-volumes around these part candidates as locations where the 3D objects are located. It is inferred from the output of the processing that the remainder of the scene volume (thus excluding the sub-volumes) is deprived of 3D objects.

In practice, the process of FIG. 4 can be done for a first part (let say the head) up to step 457 (i.e. from step 450 to 457) where part candidates of the 3D real world object are determined from the first set of part volume data $PVD_{head}$. In a slight variant which further reduces complexity, this first set of part volume data $PVD_{head}$ may be generated using large elementary voxels (for step 454), for instance by grouping several elementary voxels, typically a cube of $x^3$ elementary voxels (x integer). In that case, the same set of part volume data $PVD_{head}$ can be recomputed later on based on the restricted number of elementary voxels as described below.

Next, bounding 3D boxes are defined at step 701, around the determined part candidates in the scene volume. For instance, the bounding box may be defined based on a predefined maximum size of the 3D objet. The bounding box may be centered on a determined part candidate. The bounding box may be a cuboid or a cube whose edges are at least twice the predefined maximum size. This ensures any 3D object to which the determined part candidate (i.e. voxel) belongs to be encompassed by the bounding box.

In one specific embodiment, bounding boxes that overlap each other are merged into a new bounding box. In that case, the smallest cuboid comprising the overlapping bounding boxes may be chosen. The merging process is iterative, meaning that a new bounding box resulting from a merger can be subject to another merger with another bounding box. A number of iterations may be predefined to avoid too long processing. Alternatively, it may not be limited, in which case iterative mergers may ends to a bounding box having the size of the scene volume, in case enough 3D objects are spread over the whole volume.

Once the bounding boxes are known, the part volume data $PVD_{part}$ for the other parts (but also for the same first part in case large elementary voxels were used at step 454) are generated using only the elementary voxels of the bounding boxes for projecting step 454. In other words, the number of elementary voxels to be projected on the part maps to generate a second set of part volume data is restricted to the defined bounding boxes.

As a projection is only made from the elementary voxels of the bounding boxes, a joint part probability is computed at step 456 (for each part considered) only for this subset of elementary voxels and the obtained sets of part volume data $PVD_{part}$ only have information in the bounding boxes.

The remainder of the process (steps 458 to 462) remains unchanged.

However, an advantageous embodiment is proposed when no bounding box overlap or intersect another one, which may be obtained after having merged bounding boxes. As the bounding boxes are spatially distinct one from the other, their processing can be made independently.

This means that, once the bounding boxes are known, steps 454 to 462 can be made on a single bounding box at the same time. One or more 3D skeletons are obtained from each bounding box. This approach saves memory consumption as the amount of data to process and store at a given time is substantially reduced (because each bounding box is processed separately).

Figure 8:
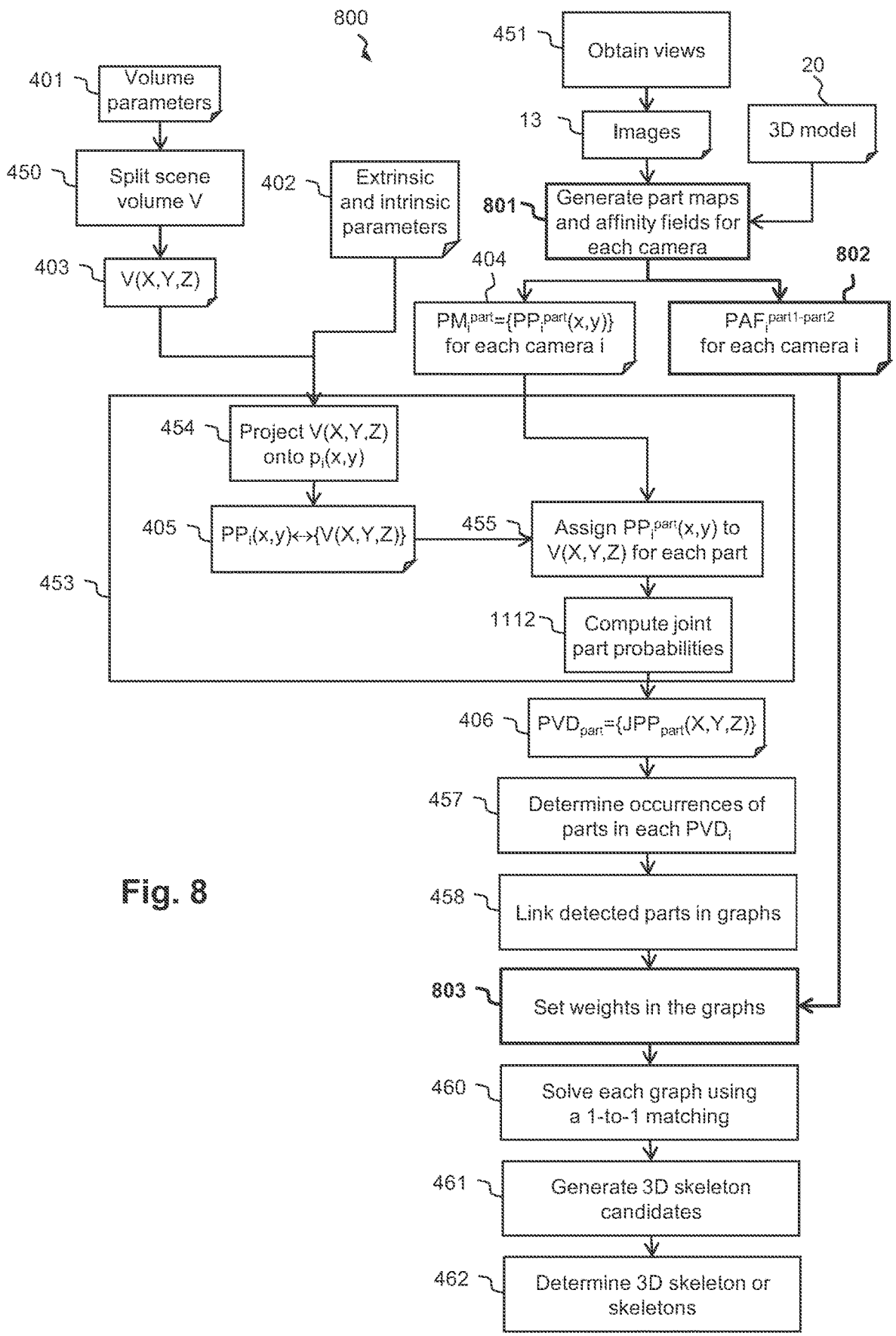
FIG. 8 illustrates, using a flowchart, third embodiments of a 3D skeleton generating method.

FIG. 8 illustrates, using a flowchart, third embodiments, which improve the first or second embodiments described above. Similar references are used between FIGS. 4 (or 7) and 8 for the same steps or data.

As described above (FIG. 4), the weights set for the links connecting two nodes (i.e. part candidates for two adjacent parts) may be the inverse of the distance between the two part candidates in the 3D space or coordinates system SYS. The sole use of the distance to weigh the links proves to be efficient to identify 3D skeletons for distant 3D objects but quite insufficient to identify 3D skeletons for intermingled 3D objects. To improve detection of the 3D objects, the third embodiments of the present invention propose to use part affinity fields PAFs to adjust the weights of the links in the graphs before the latter are solved at step 460.

Part affinity fields are known for instance from above-cited publication "*Realtime Multi-Person 2D Pose Estimation using Part Affinity Fields*". One part affinity field is generated for each pair of adjacent parts (according to the 3D model 20) and from each source image 13*i*. It is generated by the same CNN as the one used at step 452.

Similar to the part maps, a part affinity field may have the same dimensions as the source image or reduced dimensions in which case it may be upscaled to recover the same dimensions.

In detail, a part affinity field for the two adjacent parts (e.g. right foot and right knee) includes affinity vectors for respective pixels of the source image, the magnitude and direction of each affinity vector representing estimated orientation probability and orientation of an element connecting, according to the 3D model, two occurrences of said adjacent parts at the respective pixel in the source image. According to the training base used to generate the CNN, the maximal magnitude may be limited to 1.

The resolution of the part affinity fields is usually at a lower resolution than the source images. It is possible to up-sample the part affinity field to the same resolution as the source image. In such a case, an up-sampled part affinity field for the two adjacent parts (e.g. right foot and right knee) includes an affinity vector per each pixel of the source image, the magnitude and direction of each affinity vector representing estimated orientation probability and orientation of an element connecting, according to the 3D model, two occurrences of said adjacent parts at said pixel in the source image.

This up-sampling is however optional.

Figure 9:
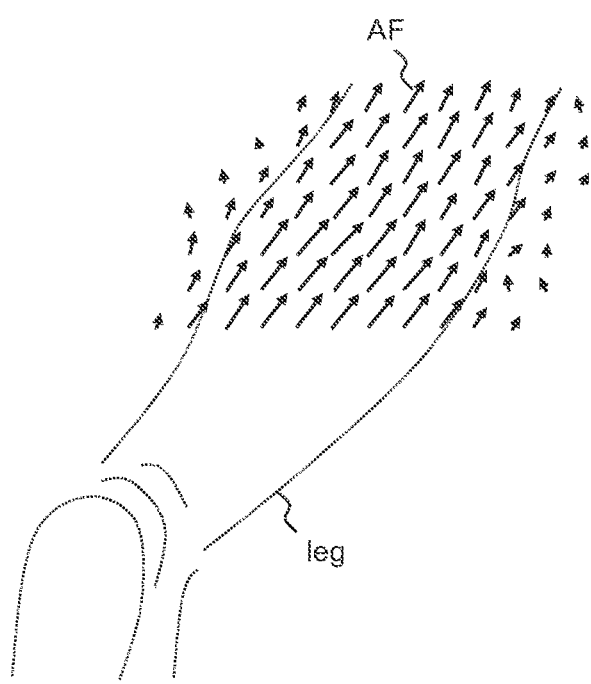
FIG. 9 schematically illustrates a portion of a part affinity field PAF between right foot and right knee in a source image.

FIG. 9 schematically illustrates a portion of a part affinity field PAF between right foot and right knee in a source image (the leg of the source image is schematically traced in dot line to show the correspondence with the affinity vectors AV). The affinity vectors of the lower part of the leg are not shown for clarity reason.

The directions of the affinity vectors show the estimated orientation of a connecting element between the two parts considered (i.e. here the estimated orientation of the leg).

The lengths of the affinity vectors show the confidence in the orientation estimation at each pixel. The longer the AVs (with a length limited to one pixel), the more certain their orientations are.

The knowledge of orientations with high probabilities (AVs with long modulus close to 1) gives relevant information on how to connect two part candidates. This can be used to favor some 1-to-1 matching when solving the graph. This is the idea of the process of FIG. 8.

As shown in FIG. 8, step 452 is replaced by step 801 where both part maps 404 (for each part of the 3D model 20) and part affinity fields 802 (for each pair of adjacent parts in the 3D model 20) are generated from each source image 13*i*.

With the example of FIG. 2, thirteen part maps and twelve part affinity fields are generated from each source image.

Steps 453 to 458 are similar to FIG. 4 or 7.

Next, at step 803, the weights set for the weighted links are based on the generated part affinity fields 802. For instance, the weight of a link connecting a first-part (e.g. right foot) candidate and a second-part (e.g. right knee) candidate in the graph is set based on the PAFs related to both adjacent first and second parts and obtained from the source images at step 801.

As it is sought to favor the pairs of first-part candidate and second-part candidate that are arranged along the same orientation as the most probable affinity vectors, the weight to be used for the link between the two candidates can be based on a scalar product between the vector formed by the two candidates and the affinity vectors. As the affinity vectors are within a 2D image, the vector formed by the two candidates can be projected onto each PAF to perform the scalar product.

In this context, it is proposed to:
project the first and second part candidates onto a generated part affinity field, and
compute the weight (for the link between the two candidates) based on affinity vectors located between the two projected part candidates in the generated part affinity field.

If the scale/resolution of the part affinity field differs from the one of the source image (e.g. if no up-sampling has been conducted), the projection consists in projecting the 3D candidates according to the intrinsic and extrinsic parameters of the source images/cameras and in scaling the obtained 2D coordinates according to the scaling factor.

The projection can be direct if the part affinity fields have been interpolated/up-sampled at the same scale as the source image.

The affinity vectors to be considered may be along the segment formed by the two candidates, in particular the closest ones. For instance, the known Bresenham's line algorithm can be used to determine which pixels (and thus associated affinity vector) to parse along this segment.

The projection and computation are preferably repeated for all the generated part affinity fields concerning the same two adjacent parts. Of course, the same process is repeated for the other pairs of adjacent parts.

In practice, the scalar products of the vector formed by the two projected part candidates and each of the affinity vectors located between the two projected part candidates (thus identified by the Bresenham's line algorithm) can be computed (to obtain elementary link weights), and then summed. The sum can then be normalized by dividing it with the modulus of the vector formed by the two projected part candidates (i.e. the projected distance between the two candidates).

It turns out that a scalar product result for the two candidates is obtained from each part affinity field (i.e. at most twelve results are obtained for 3D model 20). The results may then be summed to obtain a final weight which is assigned to the link between these two candidates in the graph concerned.

FIG. 10 schematically illustrates these scalar products in the process of solving a graph related, in the example shown, to the head and the neck as two adjacent parts. For ease of illustration, a single affinity vector is shown in dotted arrow for the head-neck connecting element in the affinity field maps instead of a plurality of shown in FIG. 9. Single affinity vectors (still in dotted arrows) for other connecting elements are also shown to illustrate an entire human being.

On top of the Figure, a simplified graph is shown with two head candidates HC1 and HC2 (white dots) and two neck candidates NC1 and NC2 (black dots). Each part candidate is associated with a joint part probability (JPP) and links between the part candidates (given morphological constraints) are shown. The weight of these links is computed based on the part affinity fields shown in the below part of the Figure. While only two PAFs, $PAF_1$ and $PAF_2$, are shown (for ease of illustration), a higher number can be used.

As far as the first link (NC1, HC1) is concerned, the two candidates are first projected onto $PAF_1$ resulting in a projected vector $Vp_1$(NC1, HC1) shown in plain arrow in (a). The normalized sum of the scalar products of $Vp_1$(NC1, HC1) with each affinity vector of $PAF_1$ located between the two projected candidates (here a single affinity vector $AV_1$ (head-neck) is shown) gives a value for instance of 0.9. The elementary weight for link HC1-NC1 and $PAF_1$ is thus 0.9.

For the same link (NC1, HC1), the two candidates are projected onto $PAF_2$ resulting in a projected vector $Vp_2$ (NC1, HC1) shown in plain arrow in (b). The normalized sum of the scalar products of $Vp_2$(NC1, HC1) with each affinity vector of $PAF_2$ located between the two projected candidates (here a single affinity vector $AV_2$(head-neck) is shown) gives a value for instance of 0.7. The elementary weight for link HC1-NC1 and $PAF_2$ is thus 0.7.

If more PAFs are available, the same calculation is done for each of them. Next, the elementary link weights for link HC1-NC1 are all summed. Here, only two elementary weights are summed, giving a weight for link HC1-NC1 equal to 0.9+0.7=1.6.

The same can be done for a second link (NC2, HC2). The candidates are projected onto PAF, as shown in (c). The normalized sum of the scalar products between $Vp_1$(NC2, HC2) and each affinity vector (here $AV_1$(head-neck)) gives an elementary weight for link HC2-NC2 and $PAF_1$ equal to 0.1.

The candidates are also projected onto $PAF_2$ as shown in (d). The normalized sum of the scalar products between $Vp_2$(NC2, HC2) and each affinity vector (here $AV_2$(head-neck)) gives an elementary weight for link HC2-NC2 and $PAF_2$ equal to 0.15.

Their sum gives a weight for link HC2-NC2 equal to 0.1+0.15=0.25.

The same is performed (not shown) for link HC1-NC2 and link HC2-NC1. Let assume a weight calculated for link HC1-NC2 is 0.3 and a weight calculated for link HC2-NC1 is 0.5.

All the calculated weights are shown in the graph on top of the Figure. Back to FIG. 8 after step 459, the remainder of the process (solving of the graphs and building the 3D skeletons) remains unchanged.

The graph solver for step 460 uses the weights calculated above. The energy to maximize is:

$$E=\Sigma e, \text{ where } e=\beta\cdot[JPP_{part-1}(\text{first node})+JPP_{part-2}(\text{second node})]+\gamma\cdot\text{weight}_{link}$$

For the exemplary graph of FIG. 10, $\beta=0.4$ and $\gamma=0.5$ are chosen, which give the following elementary energies for the pairs of part candidates:

$e_{HC1-NC1}=6.6$
$e_{HC1-NC2}=2.8$
$e_{HC2-NC1}=3.7$
$e_{HC2-NC2}=0.4$

Maximal energy is obtained by keeping links HC1-NC1 and HC2-NC2. Only 1-to-1 associations remain (here two).

However, the energy of HC2-NC2 may be considered too low to represent an actual portion of a 3D object. Thus, if a threshold is applied, HC2-NC2 can also be discarded, and only HC1-NC1 is kept as an output 1-to-1 association between part candidates.

Another method to generate object representations, namely shapes in this method, in a three-dimensional scene is known as the visual hull method or shape from silhouette or convex hull method. This method works using a similar system of a three-dimensional scene surrounded by a plurality of camera. The imaging model of all cameras are known. Each camera captures simultaneous source images of the scene. Based on reference background images, silhouettes of objects in the scene can be determined in the source images. The projection of a silhouette from a source image in the three-dimensional scene according to the imaging model of the camera allows extruding the three-dimensional space according to the silhouette. This extrusion consists in determining a zone in the three-dimensional space that cannot be part of the object as falling outside the silhouette projection. By repeating the operation for all cameras, a shape of the object is obtained. The precision of the shape depends on the number of cameras and their relevant location around the three-dimensional scene.

In practice, the three-dimensional space is divided into voxels similarly to what is done in the skeleton based method described above. Each voxel is then projected back to each source image according to the imaging model of the camera. If the voxel is projected on a background pixel, the voxel receives a "background vote". If the voxel is projected on a silhouette pixel, it does not receive a "background vote". Voxels receiving at least one background vote is considered to be outside the object. It means that if at least one camera sees the background through the voxel, this voxel cannot be part of the object. The remaining voxels, that did not receive any background vote, determine the resulting shape of the object.

This visual hull approach gives a good result on the volume of the object, but is not able to detect inner cavities, namely voxels that are not part of the object, but that are surrounded by objects. For example, considering that the objects to reconstruct are players in a rugby game, in case of a scrum, the free space in the center of the scrum is likely to be included in the resulting shape.

On the contrary, skeleton approaches by focusing on part of the body of the players is less affected by ignored inner cavities. It gives a good result on the location of each part of the players. But it lacks precision regarding the volume of the reconstructed objects, and sometimes for the connecting part of the body between two recognized nodes of the skeleton.

It is an object of embodiments of the present invention to improve an object reconstruction method by combining both approaches, namely the skeleton based approach as described above and the convex hull approach.

Figure 11:
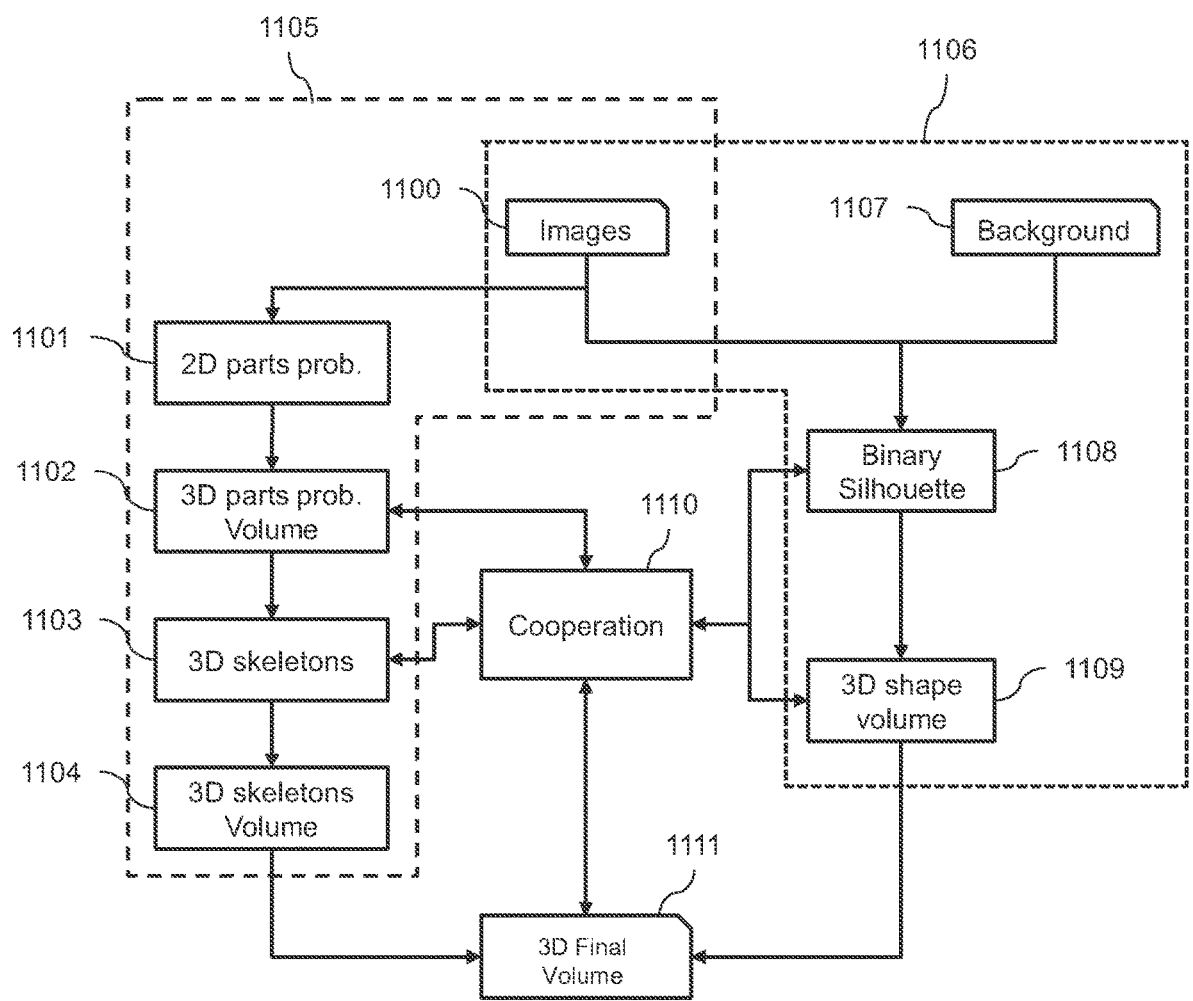
FIG. 11 illustrates the architecture of the method according to an embodiment of the invention.

FIG. 11 illustrates the architecture of the method according to an embodiment of the invention. The method is implemented in a system as illustrated in FIG. 1 and may be executed by a device as illustrated by FIG. 3.

Steps in the dotted line 1105 correspond to steps of a skeleton based method as described above. Steps in the dotted line 1106 correspond to steps of a visual hull method.

Images 1100 are the source images captured by the plurality of cameras surrounding the three-dimensional scene.

In step 1101, the two-dimensional part probability maps are computed according to the skeleton based method as described above. The maps are calculated by using deep learning network.

In step 1102, for each part detected, a three-dimensional part probability volume is determined. This volume is calculated from all the probability maps and the intrinsic and extrinsic parameters of the cameras. This step consists in dividing the three dimensions space into voxels and attributing a probability for a voxel to belong to the part based on the probability maps associated with this part of the skeleton.

In step 1103, the three-dimensional skeletons are determined by graph construction and solving based on the three-dimensional part probability volume.

All these steps have been described in detail above.

In step 1104, a further step may be added to the strict skeleton-based method described above. This step consists in determining a volume to the determined skeleton. Some volume information is available in the three-dimensional part probability volume for the different parts and limbs of the skeleton corresponding to nodes and edges of the skeleton. Volume information can be determined for the part of the body corresponding to connections between nodes/parts (limbs). For example, this volume information may be obtained by using dilating basic geometrical three-dimensional shape at the location of these connections/limbs. For example, legs parts and arms part may be obtained by dilating cylinders around the legs/arms of the 3D skeletons while the trunc may be obtained by using a dilating rectangular three-dimensional shape. The extent of the dilation can be determined according to prior knowledge associated with the skeleton. An average size of a leg, an arm or a trunc may be known from the skeleton information.

The dotted line 1106 identifies the steps of a visual hull or shape from silhouette method to determine a shape for an object to be reconstructed in the scene.

In step 1108, silhouette images are determined from the source images 1100 compared to reference background images 1107. Background images are images corresponding to the view of the scene obtained by each camera of the system when no object is present. A source image of the scene containing at least one object to be reconstructed corresponds to the reference background image except for the pixels representing the object. By comparing the current image and the corresponding reference background image, it is possible to determine a binary background information for each pixel indicating if the pixel is a background pixel or a pixel corresponding to the object. Pixels corresponding to the object constitute a silhouette of the object as seen by the camera. The silhouette may be constituted by a binary image having the same size as the source image. Each pixel of the binary image contains a binary information indicating if the corresponding pixel of the source image is a background pixel or a silhouette pixel.

In step 1109, a 3D shape volume is determined for each object in the scene from the different silhouette images. The 3D scene is divided into elementary voxels similarly to the division in voxels done in step 1102. Advantageously, the same division is done to get the same set of voxels in the 3D scene. These voxels are projected back according to the cameras imaging model into the silhouette images. Each voxel projected back to a silhouette image to a pixel corresponding to a background pixel receives a so-called background vote. When all voxels have been projected back to all silhouette images, each voxel has received a number of background votes. This number is comprised between zero and the number of silhouette images. A voxel is determined to be part of the resulting 3D shape volume if the number of background votes associated with this voxel is lower than a predetermined background threshold. This background threshold is determined based on the context of the application and the number of cameras. Typically, a background threshold of 1 is determined. In this case, it means that a voxel is determined as not being part of the object as soon as at least one camera sees the background through this voxel. A voxel is considered as being part of the object when its projection back to the silhouette images are part of the silhouettes for all the cameras. The resulting 3D shape volume may be constituted of a point cloud corresponding to the voxels determined as being part of the volume or by a 3D surface surrounding these voxels.

Both the skeleton-based method 1105 and the shape from silhouette method 1106 result in 3D volumes. In step 1111, a final 3D representation corresponding to a volume is determined based on these two 3D volumes. By consolidating the information given by both methods the resulting 3D volume is more accurate than each of the 3D volumes obtained by each method. This step will be detailed below.

In an alternative embodiment, the binary silhouettes 1108 may be also used by the cooperation module 1110.

In an alternative embodiment, the resulting 3D representation corresponds to the 3D skeletons generated in step 1103 consolidated with information from the 3D shape volume generated in step 1109.

Step 1110 represents different levels of cooperation that may be implemented between the skeleton-based method and the shape from silhouette method according to embodiments of the invention. It should be noted that arrows between the cooperation step 1110 and steps 1102, 1103, 1108, 1109 and 1111 represent different kind of interactions that may be independently implemented. All these interactions may not be present is some embodiments.

For example, in an embodiment, the probabilities used in step 1102 in the skeleton-based method may be at least partially based on information from the 3D shape volume obtained in the shape from silhouette method. For example, the cooperation module 1110 can select in the 3D shape volume 1109 voxels containing a high number of background votes. These voxels are considered to be background voxels with a high level of confidence. Consequently, the corresponding voxels of the 3D parts probability volume 1102 are selected and their probability value is decreased. In an embodiment their probability is divided by two, in another, it is set to zero.

In another embodiment, these voxels considered to be background voxels with a high level of confidence are selected. However, their probability value is left unmodified. These probability values are used for selecting voxels with a 3D local extrema of the probability value to be used as nodes of the 3D graph for extraction of the 3D skeletons in step 1104. In this embodiment, the local extrema of the graphs corresponding to voxels considered to be background voxels with a high level of confidence are removed from the graph. The graph is therefore simplified and does not contain nodes that have, from their number of background votes, a very little probability to actually correspond to an object part.

In another embodiment some of the local 3D extrema detected from the 3D parts probability volume calculated in step 1102 and used for generating a 3D graph may be removed based on information from the 3D shape volume obtained in the shape from silhouette method.

In another embodiment, some background votes may be determined based on the probability of a voxel being part of a 3D skeleton.

In yet another embodiment, the background threshold used in the shape from silhouette may be locally increased for voxels presenting a high probability to be part of a 3D skeleton. This means that the background threshold may be different for different voxels. The background threshold will be calculated according to the confidence of the generated 3D skeletons and the correlation between 3D skeletons and the 3D shape volume.

For example, the background threshold is initialized at a common value, for example 1, for all voxels. This background threshold can be modified, at a voxel level, according to correlation between each limb, or connection between skeleton parts, of the generated 3D skeleton and the shape volume generated by the silhouette method. If a voxel corresponding with high confidence to a limb of the 3D skeleton is surrounded by voxels associated with 0 background votes in the 3D shape, the background threshold of this voxel is not modified. On the contrary, if a voxel corresponding with high confidence to a limb of a 3D skeleton is surrounded by at least one voxel with one or more background votes the background threshold of those voxels is increased. It means that when a voxel of a limb is detected as a hole based on the background votes of the 3D shape, its background threshold is increased, for example to a value of 2 or 3. It will allow to fill the hole in the 3D shape based on the confidence information from the 3D skeleton. The final 3D shape is then calculated based on the modified background thresholds.

In yet another embodiment, a 3D volume may be generated from the 3D volume obtained using the skeleton-based method in absence of a corresponding volume obtained by the shape from silhouette method.

All these embodiments produce an improved 3D representation when compared to the 3D skeletons produced by the skeleton-based method or the 3D shapes produced by the shape from silhouette method. This improved 3D representation may correspond to improved 3D skeleton as generated by step 1103 or an improved 3D volume as generated by step 1111.

All these embodiments are independent in the sense that they may be implemented alone or in any kind of combination.

In one embodiment, the weights described in FIG. 4, and FIG. 8 are adjusted based on information from the 3D shape/volume obtained from the shape from silhouette method or from the binary silhouettes 1108. These weights are associated to the possible association between two candidate parts of a skeleton. They are used to compute a joined part probability that the two candidate parts are connected as being a part of the skeleton. In relation with FIG. 4, it has been described that the weights may be computed based on the distance between the two candidate parts in a step 459. In relation with FIG. 8, it has been described that part affinity fields may be further used to compute the weights in step 803 used in step 460. In embodiments, the weights can also integrate information coming from either the binary silhouettes or the 3D shape volume.

FIG. 12-*a* illustrates this embodiment. Step 1201 corresponds to step 459 of FIG. 4 and to step 803 of FIG. 8. In this step, the weights associated to each association between two candidate parts of a skeleton are determined. In this embodiment, data from the 3D shape volume determined as a result of the shape to silhouette algorithm are used to adapt the weights. For example, the number of background votes associated to voxels located between the two candidate parts are summed. The higher is this number of background votes, the lower is the associated weight. The given detailed method could be used:

Determination of the voxels of the 3D shape volume 1109 that are crossed by a 3D line joining the 2 3D candidate parts (for example, by using a 3D bresenham algorithm)

Calculation of the percentage of voxels along this line that are without background votes in the 3D shape volume 1109

Attribution of a weight corresponding to this percentage

This method is used because, if the shape from silhouette method obtains voxels that are determined to be out of the object (high level of background vote) between the two candidate parts, the chance that these two candidate parts are actually connected in a skeleton is low. This solution favors the skeleton with connections between parts that are included in the 3D shape volume as determined by the shape from silhouette method. This adjustment may be done in replacement or in addition to the contribution of the part affinity field as described in relation to FIG. 8 or in addition to the contribution of the distance weight introduced previously. In other words, the weights associated to the edges of the graph 3D (that will be used for generating 3D skeletons) can therefore be based on some 3D distance and/or PAF measures and/or 3D background votes shape volume. In order to have same reference for the 3D kinds of edge weights (distance, PAF, background votes shape volume), a normalization can be done for each class of edges (normalization of the distance weights in the graph between 0 and 1, normalization of the PAF weights in the graph between 0 and 1, normalization of the background votes shape volume weights in the graph between 0 and 1). This normalization enables to spread the importance of the class of weight in a last step (for example by multiplying all the distance weights by 0.5, by multiplying all the PAF weights by 0.25 and by multiplying all the background votes shape volume weights by 0.25).

FIG. 12*b* illustrates an embodiment wherein binary silhouettes/images 1108 are used in order to modify the weights of the graph for generating the 3D skeletons. As described above (FIG. 4), the weights set for the links connecting two nodes (i.e. part candidates for two adjacent parts) may be the inverse of the distance between the two part candidates in the 3D space or coordinates system SYS. The sole use of the distance to weigh the links proves to be efficient to identify 3D skeletons for distant 3D objects but quite insufficient to identify 3D skeletons for intermingled 3D objects. To improve detection of the 3D objects, an embodiment of the present invention proposes to use part affinity fields (PAFs) to adjust the weights of the links in the graphs before the latter are solved at step 460.

A second alternative consists in using binary silhouettes/images 1108 in addition to the weights calculated from distances between 2 nodes or/and calculated from Part Affinity Field maps.

Binary silhouettes are calculated as described in the FIG. 11. Binary silhouettes images usually have the same dimensions as the source image. Preferentially, for each source image, a binary silhouette is calculated.

Steps 453 to 458 are similar to FIG. 4 or 7.

Next, at step 803, the weights set for the weighted links are based on the binary silhouette images 1108. For instance, the weight of a link connecting a first-part (e.g. right foot) candidate and a second-part (e.g. right knee) candidate in the graph is set based on the binary silhouettes.

As it is sought to favor the pairs of 3D first-part candidate and 3D second-part candidate that are arranged to be inside binary silhouettes (when projected on binary silhouettes maps) the weight to be used for the link between the two candidates can be based on a kind of correlation between the pair of 3D first-part candidate and 3D second-part candidate (after projection on each 2D images) and 2D binary silhouettes.

In this context, it is proposed to:
project the first and second part candidates onto a generated binary silhouette, and
compute the weight (for the link between the two candidates) based on the percentage of pixels inside a foreground shape located between the two projected part candidates in the generated part binary silhouette.

The projection consists in projecting the 3D candidates according to the intrinsic and extrinsic parameters of the source images/cameras.

The number of pixels to be considered may be along the segment formed by the two candidates, in particular the closest ones. For instance, the known Bresenham's line algorithm can be used to determine which pixels to parse along this segment.

The projection and computation are preferably repeated for all the generated binary silhouettes concerning the same two adjacent parts. Of course, the same process is repeated for the other pairs of adjacent parts.

The weights associated to the edges of the graph 3D (that will be used for generating 3D skeletons) can therefore be based on some 3D distance and/or PAF measures and/or binary silhouettes measures. In order to have same reference for the 3D kinds of edge weights (distance, PAF, binary silhouette), a normalization can be done for each class of edges (normalization of the distance weights in the graph between 0 and 1, normalization of the PAF weights in the graph between 0 and 1, normalization of the binary silhouettes weights in the graph between 0 and 1). This normalization enables to spread the importance of the class of weight in a last step (for example by multiplying all the distance weights by 0.5, by multiplying all the PAF weights by 0.25 and by multiplying all the binary silhouette weights by 0.25).

Step 1102 and step 1109 in FIG. 11 both comprises the projection of each elementary voxel in the 2D space of each source image. The projection consists in determining in the 2D space of the source image the pixel location corresponding to the voxel. In step 1102, the projection is used to associate a 3D probability to the voxel from the set of 2D probability maps based on this pixel location. In step 1109, the projection is used to determine if the pixel corresponding to the voxel is a background pixel or a silhouette pixel. Assuming that the 3D space division in elementary voxels is the same for the skeleton-based method and for the shape from silhouette method, the projection may be shared between both methods.

According to an embodiment, the projection of each voxel is done once to determine the pixel location of this voxel in the 2D space of each source image. The 3D probabilities in the skeleton-based method and the number of background votes associated to the voxel are then determined based on the pixel locations given by the projection in each source image.

Figure 13:
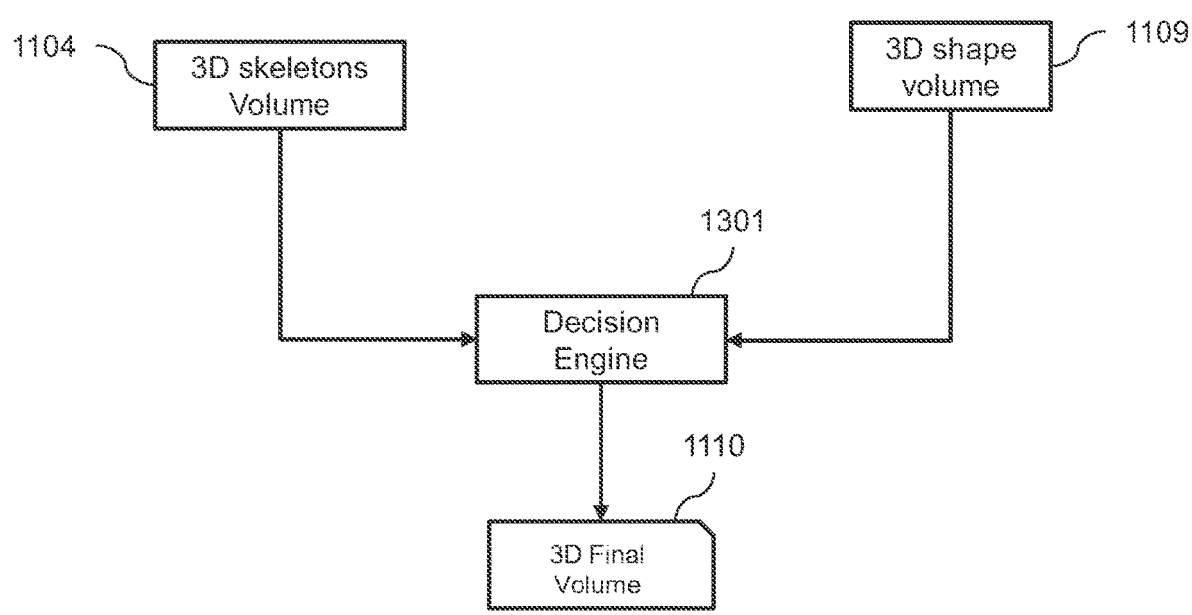
FIG. 13 illustrates the generation of a final 3D volume from the 3D skeleton volume and the 3D shape volume according to an embodiment of the invention.

FIG. 13 illustrates the generation of a final 3D volume from the 3D skeleton volume and the 3D shape volume according to an embodiment of the invention. The 3D skeleton volume is generated at step 1104 of FIG. 1. The 3D shape volume is generated by step 1109 of FIG. 1. The 3D shape volume generated by the shape from silhouette algorithm is composed by the voxels of the 3D space associated with a number of background votes. The 3D skeleton volume is composed by the extended 3D skeleton generated by the skeleton-based method and extended by dilating the edges. The 3D skeleton volume comprises voxels with associated positive probabilities to belong to a limb or a dilated edge of the skeleton.

The goal of the decision engine is to change in the 3D shape volume generated by the shape from silhouette method, the value of some of the background votes for voxels corresponding to inner cavities that are wrongly determined as part of the shape. These voxels are identified as voxels pertaining to the 3D shape volume but absent from the 3D skeleton volume. For those voxels, the background votes are set at an arbitrary high value (a value higher to the threshold 'T' used to generate the final volume/surface of the object of interest). For example, all voxels pertaining to the 3D shape volume are parsed. These voxels have a given number of background votes. For each voxel, the probabilities associated to the voxel in the 3D skeleton volume is checked. If the probability that the voxel belongs to the extended 3D skeleton indicates that it does not belong to the extended 3D skeleton volume, then a number of background votes greater or equal to the threshold is associated to the voxel. As a result, the voxel is output from the 3D shape volume.

In other words, the output 1110 of the decision engine 1301 is a 3D representation of the object that corresponds to a final 3D volume that represent the intersection of the 3D shape volume and the extended 3D skeleton volume. Although the present invention has been described hereinabove with reference to specific embodiments, the present invention is not limited to the specific embodiments, and modifications will be apparent to a skilled person in the art, which lie within the scope of the present invention.

Many further modifications and variations will suggest themselves to those versed in the art upon referring to the foregoing illustrative embodiments, which are given by way of example only and which are not intended to limit the scope of the invention, that being determined solely by the appended claims. In particular, the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for generating a 3D representation of a 3D object located in a scene volume, the method comprising by a computer system:
   obtaining from a memory of the computer system a plurality of source images of the scene volume recorded by one or more source cameras;
   executing on the obtained source images a step, of a skeleton-based method, for generating a 3D part probability volume, the 3D part probability volume being determined from part maps corresponding, for each part of a 3D real world object and each source image, to the probability for respective pixels of the source image to correspond to that part, the 3D part probability volume comprising, for each part of the 3D object according to the skeleton, a probability for a voxel of the scene volume to belong to that part;
   executing on the obtained source images a step, of a shape-from-silhouette method, for generating silhouette images of the 3D object compared to reference background images; and
   generating a 3D representation of the 3D object considering the generated 3D part probability volume and the silhouette images.

2. The method of claim 1, further comprising generating a 3D shape volume based on the silhouette images generated using a shape-from-silhouette method.

3. The method of claim 2, wherein generating the 3D shape volume includes:
   projecting a voxel of the scene volume on the silhouette images;
   determining a number of background votes for the voxel by counting the number of silhouette images for which the voxel is projected on background pixels; and
   determining that the voxel is part of the 3D shape volume if the number of background votes associated with the voxel is lower than a background threshold.

4. The method of claim 3, wherein the background threshold is predetermined.

5. The method of claim 2, wherein the probabilities of the 3D part probability volume are adjusted based on the 3D shape volume.

6. The method of claim 5, wherein a probability of a voxel of the 3D part probability volume is decreased if a number of determined background votes for the voxel is high.

7. The method of claim 6, wherein the probability of the voxel is set to zero if a number of corresponding background votes is greater or equal to one.

8. The method of claim 2, further comprising determining a 3D skeleton by graph construction based on the 3D part probability volume generated using a skeleton-based method.

9. The method of claim 3, wherein the background threshold for a voxel is dependent on the probability of that voxel to be part of the 3D skeleton.

10. The method of claim 9, wherein the background threshold is increased for voxels presenting a high probability of being part of the 3D skeleton.

11. The method of claim 8, wherein nodes of the graph are adjusted based on the 3D shape volume.

12. The method of claim 11, wherein nodes are removed from the graph based on their number of background votes.

13. The method of claim 8, wherein the graph construction for determining the 3D skeleton comprises determining weights of edges of the graph and wherein the weights are adjusted based on the 3D shape volume.

14. The method of claim 13, wherein the adjustment of the weights of the graph edges is based on the number of background votes.

15. The method of claim 8, further comprising generating a 3D skeleton volume based on the 3D skeleton.

16. The method of claim 15, wherein the generating of the 3D representation of the 3D object is based on both the 3D shape volume and the 3D skeleton volume.

17. The method of claim 16, wherein the 3D representation corresponds to the intersection of the 3D shape and skeleton volumes.

18. The method of claim 1, wherein the plurality of source images of the scene volume are recorded substantially simultaneously by a plurality of source cameras.

19. A non-transitory computer-readable medium storing a program which, when executed by a microprocessor or computer system in a device, causes the device to perform the method of claim 1.

20. A computer system for generating a 3D representation of a 3D real world object observed by source cameras in a scene volume, comprising at least one microprocessor configured for carrying out the steps of:
   obtaining from a memory of the computer system a plurality of source images of the scene volume recorded by one or more source cameras;
   executing on the obtained source images a step, of a skeleton-based method, for generating a 3D part probability volume, the 3D part probability volume being determined from part maps corresponding, for each part of a 3D real world object and each source image, to the probability for respective pixels of the source image to correspond to that part, the 3D part probability volume comprising, for each part of the 3D object according to the skeleton, a probability for a voxel of the scene volume to belong to that part;
   executing on the obtained source images a step, of a shape-from-silhouette method, for generating silhouette images of the 3D object compared to reference background images; and
   generating a 3D representation of the 3D object considering the generated 3D part probability volume and the silhouette images.

* * * * *